(12) United States Patent
Wang et al.

(10) Patent No.: US 11,082,374 B1
(45) Date of Patent: Aug. 3, 2021

(54) IDENTITY LEAK PREVENTION

(71) Applicant: Citrix Systems, Inc., Fort Lauderdale, FL (US)

(72) Inventors: Hengbo Wang, Nanjing (CN); Yanjun Su, Nanjing (CN); Daowen Wei, Nanjing (CN); Jian Ding, Nanjing (CN)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 0 days.

(21) Appl. No.: 17/034,118

(22) Filed: Sep. 28, 2020

Related U.S. Application Data

(63) Continuation of application No. PCT/CN2020/112315, filed on Aug. 29, 2020.

(51) Int. Cl.
*H04L 12/58* (2006.01)
*H04L 29/06* (2006.01)

(52) U.S. Cl.
CPC ............ *H04L 51/063* (2013.01); *H04L 51/04* (2013.01); *H04L 51/24* (2013.01); *H04L 63/0407* (2013.01)

(58) Field of Classification Search
CPC ..... H04L 51/063; H04L 51/066; H04L 51/04; H04L 63/0407; H04L 51/24; H04L 9/00
See application file for complete search history.

(56) References Cited

U.S. PATENT DOCUMENTS 6,937,730 B1    8/2005    Buxton
8,578,504 B2 *   11/2013   Brown ................ G06F 21/6209
                                                             726/26
8,914,892 B2   12/2014   Karande et al.
9,137,232 B2 *   9/2015   Eschbach ................ H04L 63/04
(Continued)

FOREIGN PATENT DOCUMENTS

CN        102938801 A     3/2013
CN        104794405 A     7/2015
(Continued)

OTHER PUBLICATIONS

U.S. Non-Final Office Action dated Dec. 10, 2020 for U.S. Appl. No. 16/780,445; 36 pages.
(Continued)

*Primary Examiner* — Sargon N Nano
(74) *Attorney, Agent, or Firm* — Daly, Crowley, Mofford & Durkee, LLP

(57) ABSTRACT

Techniques are disclosed for providing messaging participant identity leak prevention. An example methodology implementing the techniques includes, receiving, by a computing device, a message from a sender to a recipient via a software application running on the computing device, the software application having a non-confidential messaging view and a confidential messaging view. The method also includes determining a message type of the message, the message type is one of a non-confidential message or a confidential message, and displaying the message in the confidential messaging view of the software application in response to a determination that the message type indicates a confidential message, the confidential messaging view being distinct from the non-confidential messaging view, wherein messaging participant identity information is obfuscated in the display of the message in the confidential messaging view.

18 Claims, 13 Drawing Sheets

(56) References Cited

U.S. PATENT DOCUMENTS

| | | | |
|---|---|---|---|
| 9,268,398 B2 | 2/2016 | Tipirneni | |
| 9,466,266 B2* | 10/2016 | Hildreth | G06T 19/006 |
| 9,626,528 B2 | 4/2017 | Butler | |
| 9,680,836 B2* | 6/2017 | White | H04L 63/10 |
| 9,977,909 B1 | 5/2018 | Austin et al. | |
| 10,043,033 B1* | 8/2018 | Hadsall | G06F 21/84 |
| 10,255,053 B2 | 4/2019 | Giri et al. | |
| 10,305,683 B1 | 5/2019 | Ghafourifar et al. | |
| 10,430,350 B1 | 10/2019 | Nimry et al. | |
| 10,552,585 B2 | 2/2020 | Verthein et al. | |
| 10,686,824 B2 | 6/2020 | Petry et al. | |
| 2006/0075040 A1 | 4/2006 | Chmaytelli | G06Q 10/107 709/206 |
| 2006/0129948 A1 | 6/2006 | Hamzy et al. | |
| 2007/0005713 A1* | 1/2007 | LeVasseur | H04L 51/18 709/206 |
| 2008/0103799 A1* | 5/2008 | Domenikos | G06Q 30/0185 705/318 |
| 2008/0226199 A1 | 9/2008 | Breglio | |
| 2009/0257591 A1 | 10/2009 | Mithal et al. | |
| 2010/0161644 A1 | 6/2010 | Crim et al. | |
| 2011/0029774 A1* | 2/2011 | Zunke | H04L 9/0822 713/168 |
| 2011/0032913 A1 | 2/2011 | Patil et al. | |
| 2011/0251992 A1 | 10/2011 | Bethlehem et al. | |
| 2011/0302442 A1 | 12/2011 | Garrett et al. | |
| 2012/0023571 A1* | 1/2012 | Spies | H04L 63/0442 726/12 |
| 2012/0198368 A1 | 8/2012 | Bornheimer et al. | |
| 2012/0226742 A1 | 9/2012 | Momchilov et al. | |
| 2012/0323717 A1 | 12/2012 | Kirsch | |
| 2013/0117670 A1* | 5/2013 | Mahajan | G09B 5/06 715/716 |
| 2013/0145457 A1 | 6/2013 | Papakipos et al. | |
| 2013/0172027 A1* | 7/2013 | Sturges | H04W 4/12 455/466 |
| 2013/0201534 A1 | 8/2013 | Carlen et al. | |
| 2013/0339744 A1 | 12/2013 | Nagai et al. | |
| 2014/0195798 A1 | 7/2014 | Brugger et al. | |
| 2014/0201527 A1* | 7/2014 | Krivorot | G06F 21/6209 713/168 |
| 2014/0215356 A1 | 7/2014 | Brander et al. | |
| 2014/0351955 A1* | 11/2014 | White | G06F 21/56 726/27 |
| 2015/0058997 A1 | 2/2015 | Lee et al. | |
| 2015/0200922 A1* | 7/2015 | Eschbach | G06F 40/131 358/1.14 |
| 2015/0278534 A1* | 10/2015 | Thiyagarajan | G06F 21/84 726/28 |
| 2015/0288633 A1* | 10/2015 | Ogundokun | H04L 12/1822 709/206 |
| 2015/0346959 A1 | 12/2015 | Ruben et al. | |
| 2016/0054911 A1 | 2/2016 | Edwards et al. | |
| 2016/0078247 A1 | 3/2016 | Tucker et al. | |
| 2016/0099935 A1 | 4/2016 | Luskin et al. | |
| 2016/0112209 A1 | 4/2016 | Yoon et al. | |
| 2016/0179454 A1 | 6/2016 | Liu | |
| 2016/0188883 A1 | 6/2016 | Wang et al. | |
| 2016/0188973 A1 | 6/2016 | Ziaja et al. | |
| 2016/0191442 A1* | 6/2016 | Penilla | H04L 51/22 709/206 |
| 2016/0255084 A1* | 9/2016 | White | H04L 61/3015 726/27 |
| 2016/0269440 A1* | 9/2016 | Hartman | H04L 9/14 |
| 2016/0328522 A1 | 11/2016 | Howley | |
| 2017/0249432 A1 | 8/2017 | Grantcharov | |
| 2017/0323099 A1 | 11/2017 | Song | |
| 2017/0364595 A1 | 12/2017 | Desai et al. | |
| 2017/0372527 A1 | 12/2017 | Murali et al. | |
| 2018/0014150 A1 | 1/2018 | Elias | |
| 2018/0053003 A1 | 2/2018 | Nair | |
| 2018/0054414 A1* | 2/2018 | LeVasseur | G06F 21/606 |
| 2018/0071634 A1* | 3/2018 | Carvallo | A63F 13/335 |
| 2018/0082068 A1 | 3/2018 | Lancioni et al. | |
| 2018/0122506 A1 | 5/2018 | Grantcharov et al. | |
| 2018/0136898 A1 | 5/2018 | Shi et al. | |
| 2018/0145835 A1 | 5/2018 | Barbour et al. | |
| 2018/0150647 A1 | 5/2018 | Naqvi et al. | |
| 2018/0183581 A1 | 6/2018 | Elbaz et al. | |
| 2018/0191701 A1 | 7/2018 | Kong et al. | |
| 2018/0262480 A1* | 9/2018 | Doi | H04L 63/083 |
| 2018/0276393 A1 | 9/2018 | Allen et al. | |
| 2018/0285591 A1 | 10/2018 | Thayer et al. | |
| 2018/0285592 A1* | 10/2018 | Sharifi | G06F 21/84 |
| 2018/0337918 A1 | 11/2018 | Chang et al. | |
| 2018/0343321 A1 | 11/2018 | Chang | |
| 2018/0351961 A1 | 12/2018 | Calcaterra et al. | |
| 2019/0012646 A1 | 1/2019 | Seidl et al. | |
| 2019/0013646 A1 | 1/2019 | Tan et al. | |
| 2019/0019177 A1 | 1/2019 | Lee et al. | |
| 2019/0042059 A1 | 2/2019 | Baer | |
| 2019/0050592 A1 | 2/2019 | Grau | |
| 2019/0073490 A1 | 3/2019 | Agrawal et al. | |
| 2019/0080072 A1 | 3/2019 | Van Os et al. | |
| 2019/0102263 A1 | 4/2019 | Singh et al. | |
| 2019/0102574 A1 | 4/2019 | Roberts et al. | |
| 2019/0171794 A1 | 6/2019 | Dhruva et al. | |
| 2019/0278961 A1 | 9/2019 | Schrader et al. | |
| 2019/0327215 A1 | 10/2019 | Bastian et al. | |
| 2019/0349366 A1 | 11/2019 | Dewan et al. | |
| 2019/0386971 A1 | 12/2019 | Venkiteswaran et al. | |
| 2020/0012793 A1 | 1/2020 | Avraham et al. | |
| 2020/0019729 A1 | 1/2020 | Shanmugam et al. | |
| 2020/0028836 A1 | 1/2020 | Gandhi et al. | |
| 2020/0074090 A1 | 3/2020 | Naqvi et al. | |
| 2020/0074109 A1 | 3/2020 | Pieniazek et al. | |
| 2020/0106749 A1 | 4/2020 | Jain et al. | |
| 2020/0110301 A1* | 4/2020 | Harrold | G02F 1/13725 |
| 2020/0151348 A1 | 5/2020 | Chauhan | |
| 2020/0193031 A1 | 6/2020 | Avraham et al. | |
| 2020/0228561 A1 | 7/2020 | Petry et al. | |
| 2020/0310945 A1 | 10/2020 | Scoda | |
| 2020/0320638 A1* | 10/2020 | Erickson | G06N 7/005 |
| 2020/0380146 A1 | 12/2020 | Dodor et al. | |
| 2021/0051294 A1 | 2/2021 | Roedel et al. | |

FOREIGN PATENT DOCUMENTS

| | | |
|---|---|---|
| CN | 105162693 A | 12/2015 |
| CN | 106716436 A | 5/2017 |
| CN | 106933465 A | 7/2017 |
| CN | 108509169 A | 9/2018 |
| CN | 110378145 A | 10/2019 |
| CN | 110998573 A | 4/2020 |
| CN | 111338744 A | 6/2020 |
| EP | 2874396 A1 | 5/2015 |
| WO | WO 2013/101084 A1 | 7/2013 |
| WO | WO2016205241 A | 12/2016 |
| WO | WO2018102286 | 6/2018 |

OTHER PUBLICATIONS

U.S. Appl. No. 16/716,669, filed Dec. 17, 2019, Singh.
U.S. Appl. No. 16/725,295, filed Dec. 23, 2019, Bhaskar S, et al.
U.S. Appl. No. 16/716,761, filed Dec. 17, 2019, Singh.
U.S. Appl. No. 16/835,928, filed Mar. 31, 2020, Singh.
U.S. Appl. No. 16/870,056, filed May 8, 2020, Jiang, et al.
U.S. Appl. No. 16/369,648, filed Mar. 29, 2019, Singh, et al.
U.S. Appl. No. 16/910,615, filed Jun. 24, 2020, Qiao, et al.
U.S. Appl. No. 17/073,773, filed Oct. 19, 2020, Qian, et al.
U.S. Appl. No. 16/185,724, filed Nov. 9, 2018, Chauhan.
U.S. Appl. No. 16/780,445, filed Feb. 3, 2020, Singh, et al.
European Search Report and Written Opinion dated Mar. 31, 2020 for EP Application No. 19207955.6; 9 Pages.
Text Mask: Hide Confidential Page Content—Chrome Web Store; Downloaded from https://chrome.google.com/webstore/detail/text-mask-hide-confidenti/icodoomkkkhijlceahdabhkgdelffail?hl=en; Dec. 13, 2018; 6 pages.
"IBM Researchers Develop Shield to Mask Sensitive On-Screen Info" Downloaded from https://www.firstpost.com/business/biztech/

(56) References Cited

OTHER PUBLICATIONS ibm-researchers-develop-shield-to-mask-sensitive-on-screen-info-1873185.html; Jul. 10, 2009; 11 pages.

Goldsteen, et al., "Application-screen Masking: A Hybrid Approach;" Downloaded from https://www.firstpost.com/business/biztech/ibm-researchers-develop-shield-to-mask-sensitive-on-screen-info-1873185.html; Jul. 2015; 10 Pages.

U.S. Non-Final Office Action dated Jun. 6, 2019 for U.S. Appl. No. 16/185,724; 11 Pages.

U.S. Final Office Action dated Oct. 23, 2019 for U.S. Appl. No. 16/185,724; 12 Pages.

U.S. Non-Final Office Action dated Mar. 24, 2020 for U.S. Appl. No. 16/185,724; 11 Pages.

U.S. Final Office Action dated Sep. 9, 2020 for U.S. Appl. No. 16/185,724; 11 Pages.

PCT International Search Report and Written Opinion dated Oct. 27, 2020 for International Application No. PCT/US2020/051150; 12 Pages.

PCT Invitation to Pay Additional Fees dated Mar. 16, 2021 for International Application No. PCT/US2020/062770; 12 pages.

U.S. Non-Final Office Action dated Apr. 13, 2021 for U.S. Appl. No. 16/716,669; 21 pages.

PCT International Search Report and Written Opinion dated Feb. 23, 2021 for International Application No. PCT/CN2020/091951; 9 pages.

PCT International Search Report and Written Opinion dated Feb. 16, 2021 for International Application No. PCT/US2020/061927; 13 pages.

U.S. Non-Final Office Action dated Mar. 4, 2021 for U.S. Appl. No. 17/073,773; 17 pages.

U.S. Non-Final Office Action dated Mar. 15, 2021 for U.S. Appl. No. 16/185,724; 14 pages.

U.S. Non-Final Office Action dated Apr. 30, 2021 for U.S. Appl. No. 16/369,648; 26 pages.

U.S. Final Office Action dated May 13, 2021 for U.S. Appl. No. 17/073,773; 14 pages.

PCT International Search Report and Written Opinion dated May 10, 2021 for International Application No. PCT/US2020/062770; 19 pages.

PCT International Search Report and Written Opinion dated May 26, 2021 for International Application No. PCT/CN2020/111793; 9 pages.

PCT International Search Report and Written Opinion dated Jun. 3, 2021 for International Application No. PCT/CN2020/112315; 9 pages.

U.S. Final Office Action dated Jun. 9, 203721 for U.S. Appl. No. 16/780,445; 37 pages.

\* cited by examiner

IDENTITY LEAK PREVENTION

CROSS REFERENCE TO RELATED APPLICATION

This application is a continuation of and claims the benefit of PCT Patent Application No. PCT/CN2020/112315 filed on Aug. 29, 2020 in the English language in the State Intellectual Property Office and designating the United States, the contents of which are hereby incorporated herein by reference in its entirety.

BACKGROUND

Due, at least in part, to the growth of networks, such as the Internet, messaging, such as instant messaging, live chatting, and text messaging, has become very common in everyday life. For example, online social networks, such as Facebook, Line, Twitter, and WeChat, provide messaging services that allow participants to use their computing devices to send various forms of media, including text, emoji, images, videos, and animations, to each other in real-time or near real-time. Depending upon the participants, the context of the conversation, and/or the subject matter being discussed, the content of a given message may be public (not confidential) or confidential.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with one example embodiment provided to illustrate the broader concepts, systems, and techniques described herein, a method may include receiving, by a computing device, a message from a sender to a recipient via a software application running on the computing device, the software application having a non-confidential messaging view and a confidential messaging view. The method may also include determining, by the computing device, a message type of the message, the message type is one of a non-confidential message or a confidential message, and displaying, by the computing device, the message in the confidential messaging view of the software application in response to a determination that the message type indicates a confidential message, wherein messaging participant identity information is obfuscated in the display of the message in the confidential messaging view. The confidential messaging view may be distinct from the non-confidential messaging view.

According to another illustrative embodiment provided to illustrate the broader concepts described herein, a system includes a memory and one or more processors in communication with the memory. The processor may be configured to receive a message from a sender to a recipient via a software application running on the computing device, the software application having a non-confidential messaging view and a confidential messaging view. The processor may be further configured to determine a message type of the message, the message type being one of a non-confidential message or a confidential message, and display the message in the confidential messaging view of the software application in response to a determination that the message type indicates a confidential message such that messaging participant identity information is obfuscated in the display of the message in the confidential messaging view, wherein the confidential messaging view is distinct from the non-confidential messaging view.

According to another illustrative embodiment provided to illustrate the broader concepts described herein, a method may include, by a computing device, receiving a message via a software application running on the computing device and, responsive to a determination that the message is a non-confidential message, displaying the message in a non-confidential messaging view of the software application such that messaging participant identity information is viewable and, responsive to a determination that the message is a confidential message, displaying the message in a confidential messaging view of the software application such that messaging participant identity information is obfuscated.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Figure 1:
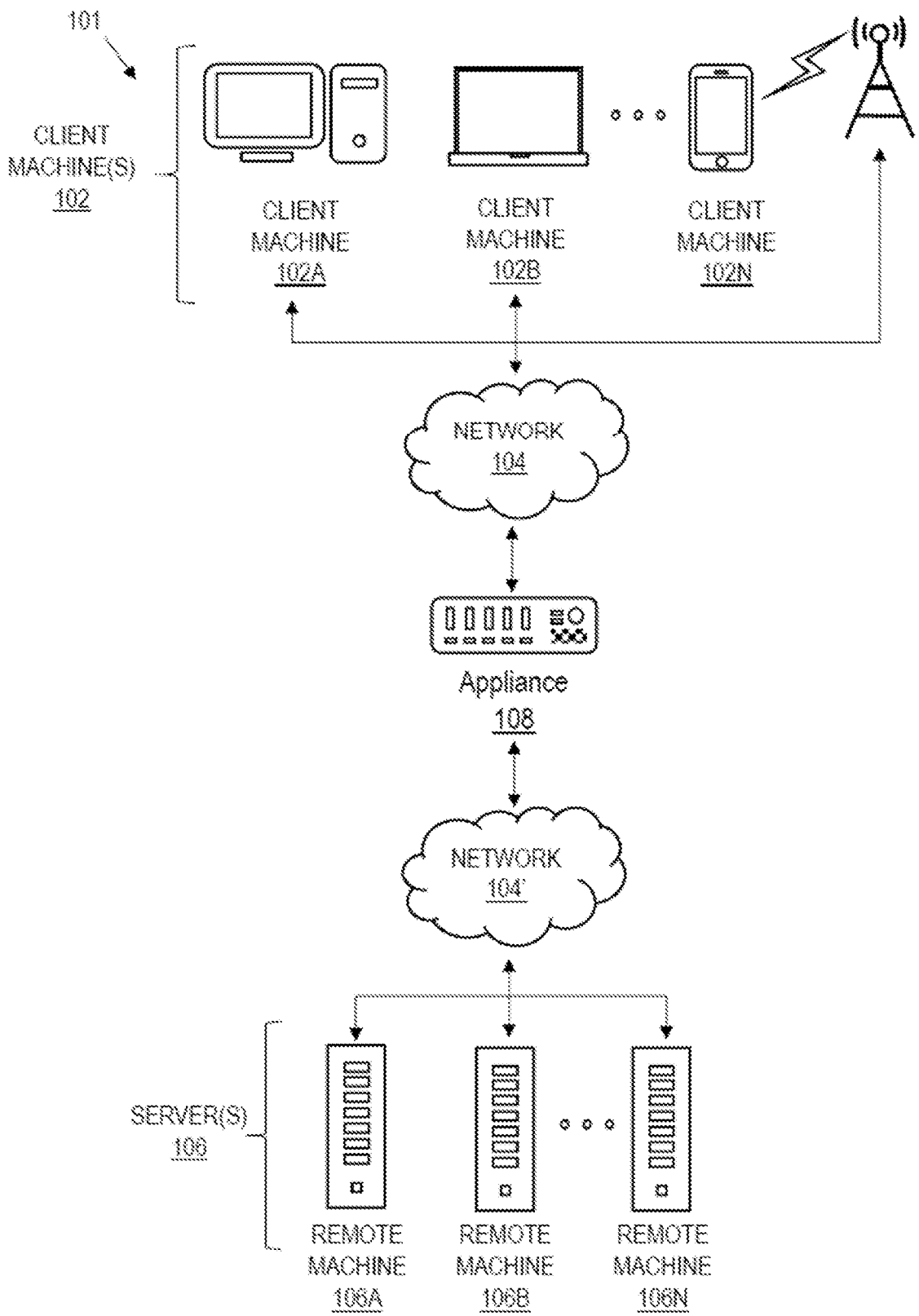
FIG. 1 is a diagram of an illustrative network computing environment in which embodiments of the present disclosure may be implemented.

Online social networks provide an infrastructure that enable users to rapidly share, gather, and process information by messaging. For example, sharing of a message usually passes via a centralized server and involves one participant uploading a message to the web file server/storage container, which then distributes the message to other participants. The use of the centralized server to send messages may be undesirable due to concerns related to privacy, conservation of server-side resources, etc.

Messaging participants must also concern themselves with privacy during their communications. For example, a messaging participant may be concerned that a message communicated in private to a trusted person may be leaked and communicated to persons other than the trusted messaging participant. As another example, messaging participants may be concerned that the messages are being recorded and may later resurface in an undesired manner. In some cases, due to the nature of the messaging formats, statements in later resurfaced messages may be taken out of context. In other cases, participants exchanging messages may simply desire the liberty to exchange their thoughts openly, but since the messages are likely to be saved in some form, open communications between messaging participants are hindered.

Concepts, devices, systems, and techniques are disclosed for providing messaging participant identity leak prevention. Messaging participant identity leak prevention is achieved by obfuscating information that may reveal the identities of the messaging participants, such as, by way of example, names, user identifiers, avatars, and other identifying information, in the display of the messages and/or conversations to which the messages belong. As a result, even in the case where a screenshot (sometimes referred to as screen capture or screen grab) of the display of the message or conversation that includes the message (sometimes referred to herein more simply as a "messaging conversation") is leaked or otherwise provided to persons other than the intended messaging participants, the identities of the messaging participants are shielded and not leaked or disclosed.

According to some embodiments disclosed herein, a messaging application is programmed or otherwise configured to provide a user access to a confidential messaging view (sometimes referred to herein more simply as a "confidential view") that allows a user, as a messaging participant, to participate in a confidential messaging conversation with one or more peer messaging participants. For example, the user can use the confidential messaging view to compose and send a confidential (private) message to a specific peer messaging participant (sometimes referred to herein as a confidential peer-to-peer messaging conversation) or a group of peer messaging participants (sometimes referred to herein as a confidential group messaging conversation). When displaying the confidential message in the confidential messaging view, the messaging application obfuscates the messaging participant identity information (e.g., the name or identity of the peer messaging participant or group of peer messaging participants, avatars representing the messaging participants, and the like) that may be displayed in the confidential messaging view. The user can then use the confidential messaging view to compose and send one or more subsequent confidential messages in the confidential messaging conversation to the peer messaging participant or group of peer messaging participants.

The provided confidential messaging view also displays the confidential messages received by the user in the particular confidential peer-to-peer messaging conversation or confidential group messaging conversation. For example, in the case where the user receives a new confidential message in a particular confidential peer-to-peer messaging conversation, the received new confidential message can be displayed in the confidential messaging view as a confidential message belonging to the particular confidential peer-to-peer messaging conversation. In the example case where the user receives a new confidential message in a particular confidential group messaging conversation, the received new confidential message can be displayed in the confidential messaging view as a confidential message belonging to the particular confidential group messaging conversation. In any case, the messaging application can display in a confidential messaging view the confidential messages belonging to a particular confidential peer-to-peer messaging conversation or confidential group messaging conversation between the user and one or more peer messaging participants while obfuscating the messaging participant identity information that may be displayed in the confidential messaging view. Thus, in a confidential messaging view the messaging application maintains or otherwise keeps track of the messages belonging to a confidential messaging conversation between messaging participants.

As an example, suppose user X is using the messaging application to participate in a confidential messaging conversation with a peer messaging participant Y. In this example case, the messaging application can generate and provide to user X a first confidential messaging view with which the user can compose and send confidential messages to peer messaging participant Y in the confidential messaging conversation between user X and peer messaging participant Y.

Continuing the above example, the messaging application can also display in the first confidential messaging view the confidential messages received by user A in the confidential messaging conversation between user A and peer messaging participant Y. Now suppose that user X uses the messaging application to participate in a confidential messaging conversation with a peer messaging participant Z. In this example case, the messaging application can generate and provide to user X a second confidential messaging view with which the user can compose and send confidential messages to peer messaging participant Z in the confidential messaging conversation between user X and peer messaging participant Z. The messaging application can also display in the second confidential messaging view the confidential messages received by user X in the confidential messaging conversation between user X and peer messaging participant Z. In this way, each confidential messaging view displays the confidential messages belong to a particular confidential messaging conversation between a messaging participant and a peer messaging participant. In other words, a confidential messaging view allows the messaging application to maintain or otherwise keep track of the messages contained in a particular confidential messaging conversation or confidential message thread between peer messaging participants. Note that in the example above peer messaging participant Y and peer messaging participant Z can be a single peer messaging participant or a group of peer messaging participants.

Although certain embodiments and/or examples are described herein in the context of messaging applications, it will be appreciated in light of this disclosure that such embodiments and/or examples are not restricted as such, but are applicable to collaboration applications or messenger applications that provide real-time or near real-time communication between messaging participants in the general sense. Numerous variations and configurations, as well as numerous publishing applications, will be apparent in light of this disclosure.

According to an example methodology, when the messaging application is instantiated on a computing device, for example, by a user wanting to use the messaging application to participate in a messaging conversation with another messaging participant, the messaging application may initially generate and provide a non-confidential messaging view (sometimes referred to herein more simply as a "non-confidential view") for use by the user. In the display of the non-confidential messaging view, the messaging application does not obfuscate the messaging participant identity information but, rather, displays the messaging participant identity information in a form that is intelligible to a viewer. The user can then use the provided non-confidential messaging view to compose and send one or more messages to the other peer messaging participant. The messages sent using the provided non-confidential messaging view are considered to be non-confidential (public) messages (messages belonging to a non-confidential messaging conversation) between the user and the other peer messaging participant since the messaging participant identity information is not obfuscated when the messages are displayed in the non-confidential messaging view.

Continuing the example methodology above, to send a confidential message to the other peer messaging participant, the user can activate a control mechanism, such as a confidential messaging view control, provided by the messaging application. In response to activation of the provided control mechanism, the messaging application generates and provides a confidential messaging view with which the user can compose and send one or more confidential messages to the other peer messaging participant. The messages sent using the confidential messaging view are considered to be confidential messages (messages belonging to a confidential messaging conversation) between the user and the other peer messaging participant and the messaging participant identity information is obfuscated when the messages are displayed in the confidential messaging view. In any case, in such implementations, the messaging application provides both a non-confidential messaging view and a confidential messaging view with which the user can participate in a non-confidential messaging conversation and a confidential messaging conversation, respectively, with the other peer messaging participant. For example, the user can use the non-confidential messaging view to compose and send one or more non-confidential messages to the other peer messaging participant and use the confidential messaging view to send one or more confidential messages to the other peer messaging participant. As described previously, the message sent using the non-confidential messaging view belongs to a non-confidential messaging conversation between the user and the other peer messaging participant. The message sent using the confidential messaging view belongs to a confidential messaging conversation between the user and the other peer messaging participant. These and other advantages, variations, and embodiments will be apparent in light of this disclosure.

Referring now to FIG. 1, shown is an illustrative network environment 101 of computing devices in which various aspects of the disclosure may be implemented, in accordance with an embodiment of the present disclosure. As shown, environment 101 includes one or more client machines 102A-102N, one or more remote machines 106A-106N, one or more networks 104, 104', and one or more appliances 108 installed within environment 101. Client machines 102A-102N communicate with remote machines 106A-106N via networks 104, 104'.

In some embodiments, client machines 102A-102N communicate with remote machines 106A-106N via an intermediary appliance 108. The illustrated appliance 108 is positioned between networks 104, 104' and may also be referred to as a network interface or gateway. In some embodiments, appliance 108 may operate as an application delivery controller (ADC) to provide clients with access to business applications and other data deployed in a datacenter, a cloud computing environment, or delivered as Software as a Service (SaaS) across a range of client devices, and/or provide other functionality such as load balancing, etc. In some embodiments, multiple appliances 108 may be used, and appliance(s) 108 may be deployed as part of network 104 and/or 104'.

Client machines 102A-102N may be generally referred to as client machines 102, local machines 102, clients 102, client nodes 102, client computers 102, client devices 102, computing devices 102, endpoints 102, or endpoint nodes 102. Remote machines 106A-106N may be generally referred to as servers 106 or a server farm 106. In some embodiments, a client device 102 may have the capacity to function as both a client node seeking access to resources provided by server 106 and as a server 106 providing access to hosted resources for other client devices 102A-102N. Networks 104, 104' may be generally referred to as a network 104. Networks 104 may be configured in any combination of wired and wireless networks.

Server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

Server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, server 106 may execute a remote presentation services program or other program that uses a thin-client or a remote-display protocol to capture display output generated by an application executing on server 106 and transmit the application display output to client device 102.

In yet other embodiments, server 106 may execute a virtual machine providing, to a user of client device 102, access to a computing environment. Client device 102 may be a virtual machine. The virtual machine may be managed by, for example, a hypervisor, a virtual machine manager (VMM), or any other hardware virtualization technique within server 106.

In some embodiments, network 104 may be: a local-area network (LAN); a metropolitan area network (MAN); a wide area network (WAN); a primary public network; and a primary private network. Additional embodiments may include a network 104 of mobile telephone networks that use various protocols to communicate among mobile devices. For short range communications within a wireless local-area network (WLAN), the protocols may include 802.11, Bluetooth, and Near Field Communication (NFC).

Figure 2:
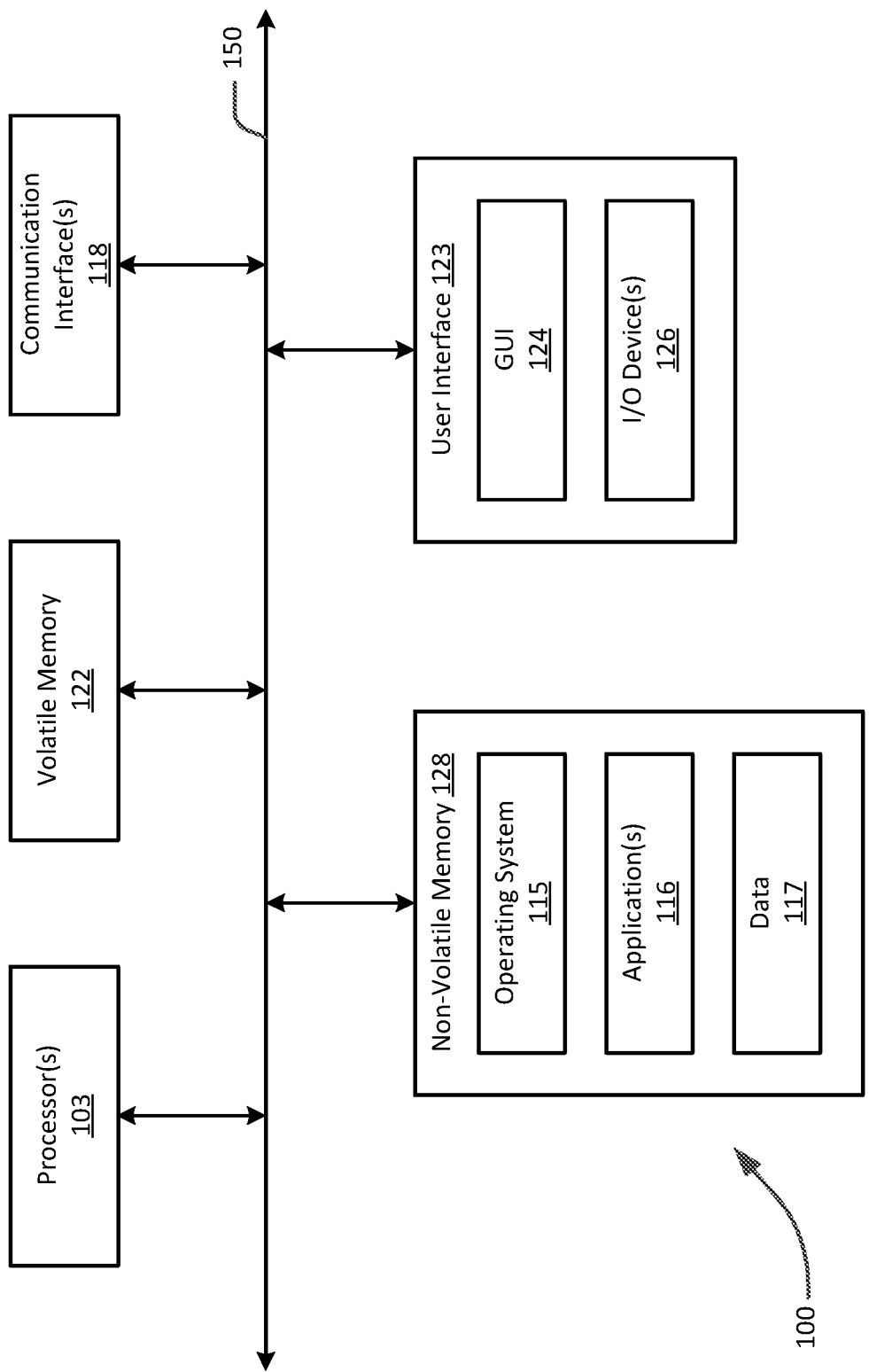
FIG. 2 is a block diagram illustrating selective components of an example computing device in which various aspects of the disclosure may be implemented, in accordance with an embodiment of the present disclosure.

FIG. 2 is a block diagram illustrating selective components of an illustrative computing device 100 in which various aspects of the disclosure may be implemented, in accordance with an embodiment of the present disclosure. For instance, client devices 102, appliances 108, and/or servers 106 of FIG. 1 can be substantially similar to computing device 100. As shown, computing device 100 includes one or more processors 103, a volatile memory 122 (e.g., random access memory (RAM)), a non-volatile memory 128, a user interface (UI) 123, one or more communications interfaces 118, and a communications bus 150.

Non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

Non-volatile memory 128 stores an operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computing device 100 may communicate via communications bus 150.

The illustrated computing device 100 is shown merely as an illustrative client device or server and may be implemented by any computing or processing environment with any type of machine or set of machines that may have suitable hardware and/or software capable of operating as described herein.

Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 103 may be analog, digital or mixed signal. In some embodiments, processor 103 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 118 may include one or more interfaces to enable computing device 100 to access a computer network such as a Local Area Network (LAN), a Wide Area Network (WAN), a Personal Area Network (PAN), or the Internet through a variety of wired and/or wireless connections, including cellular connections.

In described embodiments, computing device 100 may execute an application on behalf of a user of a client device. For example, computing device 100 may execute one or more virtual machines managed by a hypervisor. Each virtual machine may provide an execution session within which applications execute on behalf of a user or a client device, such as a hosted desktop session. Computing device 100 may also execute a terminal services session to provide a hosted desktop environment. Computing device 100 may provide access to a remote computing environment including one or more applications, one or more desktop applications, and one or more desktop sessions in which one or more applications may execute.

Figure 3:
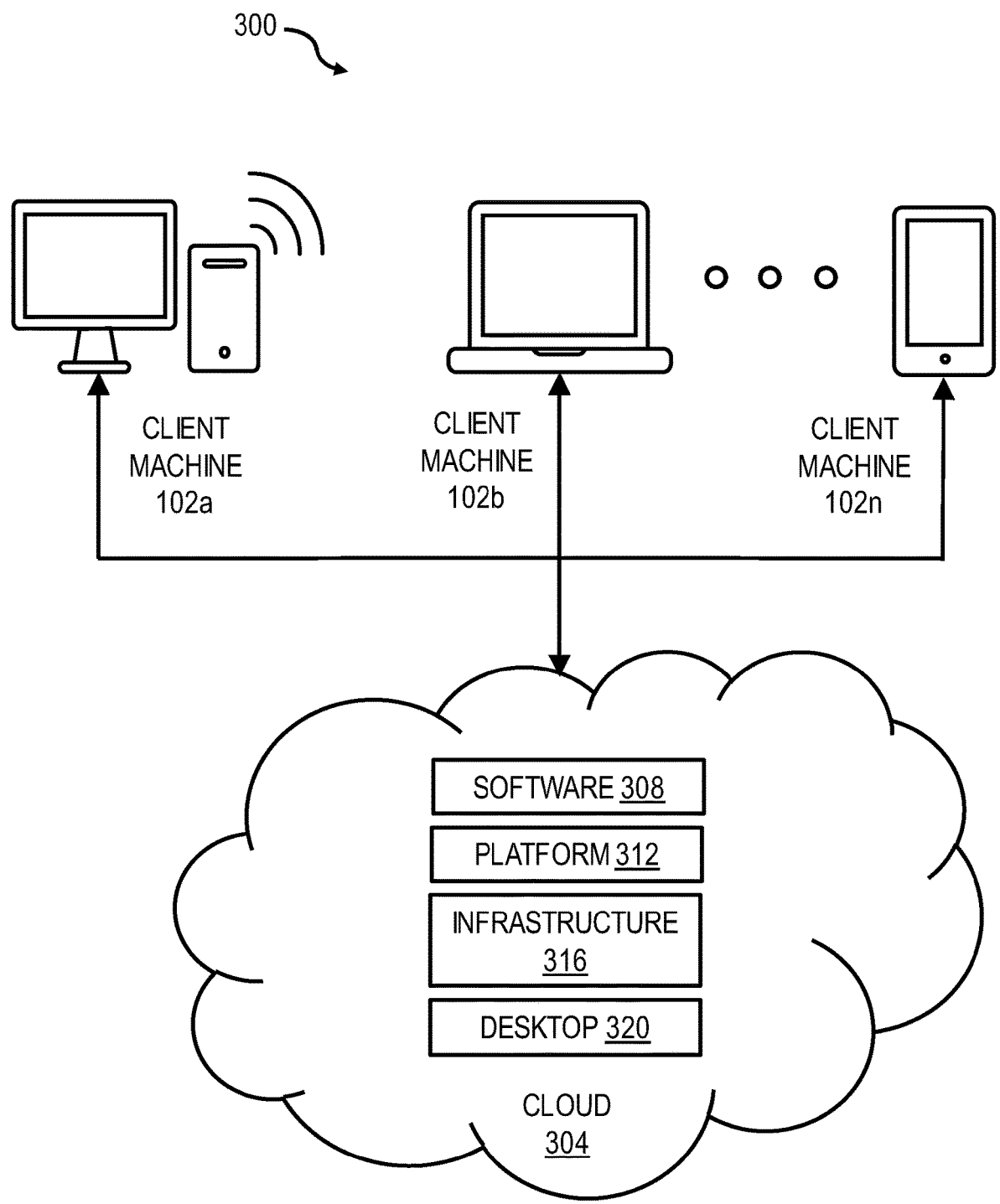
FIG. 3 is a schematic block diagram of a cloud computing environment in which various aspects of the disclosure may be implemented.

Referring to FIG. 3, a cloud computing environment 300 is depicted, which may also be referred to as a cloud environment, cloud computing or cloud network. Cloud computing environment 300 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In cloud computing environment 300, one or more clients 102a-102n (such as those described above) are in communication with a cloud network 304. Cloud network 304 may include back-end platforms, e.g., servers, storage, server farms or data centers. The users or clients 102a-102n can correspond to a single organization/tenant or multiple organizations/tenants. More particularly, in one illustrative implementation, cloud computing environment 300 may provide a private cloud serving a single organization (e.g., enterprise cloud). In another example, cloud computing environment 300 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, cloud computing environment 300 may provide a hybrid cloud that is a combination of a public cloud and a private cloud. Public clouds may include public servers that are maintained by third parties to clients 102a-102n or the enterprise/tenant. The servers may be located off-site in remote geographical locations or otherwise.

Cloud computing environment 300 can provide resource pooling to serve multiple users via clients 102a-102n through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, cloud computing environment 300 can provide on-demand self-service to unilaterally provision computing capabilities (e.g., server time, network storage) across a network for multiple clients 102a-102n. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. Cloud computing environment 300 can provide an elasticity to dynamically scale out or scale in response to different demands from one or more clients 102. In some embodiments, cloud computing environment 300 can include or provide monitoring services to monitor, control and/or generate reports corresponding to the provided shared services and resources.

In some embodiments, cloud computing environment 300 may provide cloud-based delivery of different types of cloud computing services, such as Software as a service (SaaS) 308, Platform as a Service (PaaS) 312, Infrastructure as a Service (IaaS) 316, and Desktop as a Service (DaaS) 320, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g., Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Wash. (herein "Azure"), or AMAZON WEB SERVICES provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

Figure 4A:
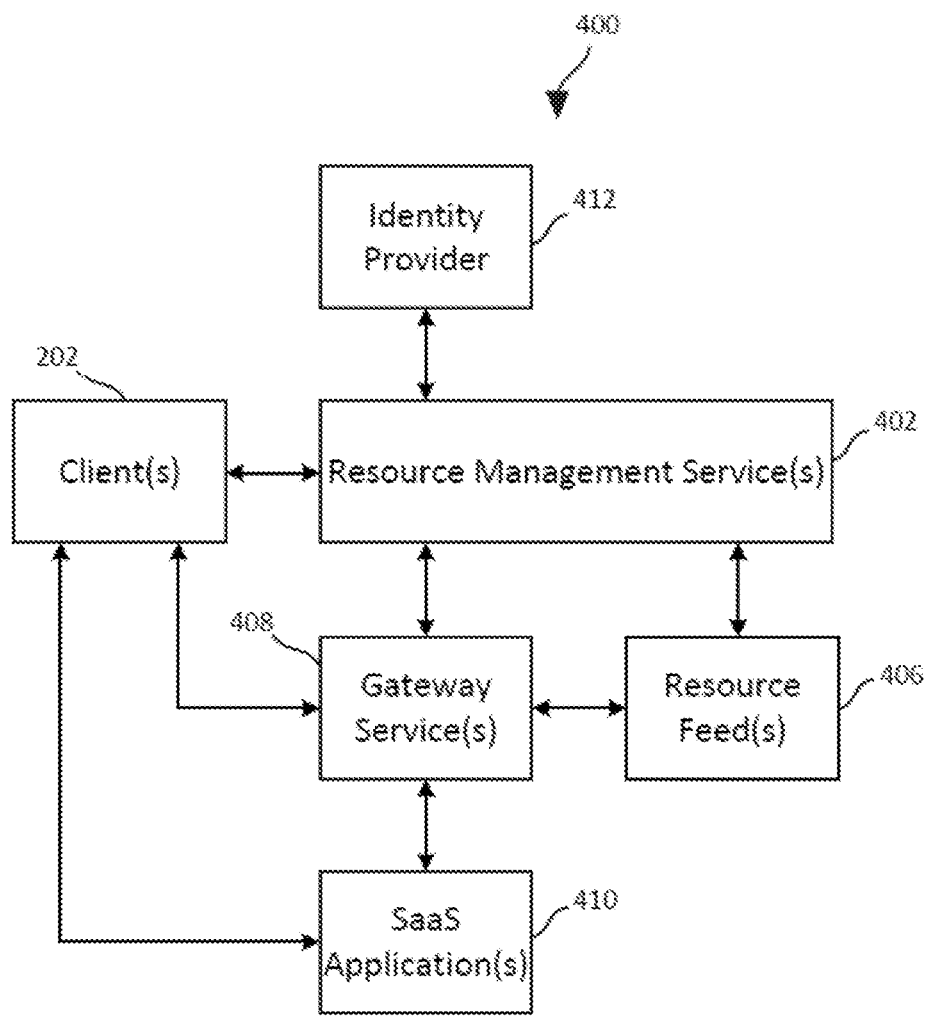
FIG. 4A is a block diagram of an illustrative system in which resource management services may manage and streamline access by clients to resource feeds (via one or more gateway services) and/or software-as-a-service (SaaS) applications.

FIG. 4A is a block diagram of an illustrative system 400 in which one or more resource management services 402 may manage and streamline access by one or more clients 202 to one or more resource feeds 406 (via one or more gateway services 408) and/or one or more software-as-a-service (SaaS) applications 410. In particular, resource management service(s) 402 may employ an identity provider 412 to authenticate the identity of a user of a client 202 and, following authentication, identify one of more resources the user is authorized to access. In response to the user selecting one of the identified resources, resource management service(s) 402 may send appropriate access credentials to the requesting client 202, and the requesting client 202 may then use those credentials to access the selected resource. For resource feed(s) 406, client 202 may use the supplied credentials to access the selected resource via gateway service 408. For SaaS application(s) 410, client 202 may use the credentials to access the selected application directly.

Client(s) 202 may be any type of computing devices capable of accessing resource feed(s) 406 and/or SaaS application(s) 410, and may, for example, include a variety of desktop or laptop computers, smartphones, tablets, etc. Resource feed(s) 406 may include any of numerous resource types and may be provided from any of numerous locations. In some embodiments, for example, resource feed(s) 406 may include one or more systems or services for providing virtual applications and/or desktops to client(s) 202, one or more file repositories and/or file sharing systems, one or more secure browser services, one or more access control services for SaaS applications 410, one or more management services for local applications on client(s) 202, one or more internet enabled devices or sensors, etc. Each of resource management service(s) 402, resource feed(s) 406, gateway service(s) 408, SaaS application(s) 410, and identity provider 412 may be located within an on-premises data center of an organization for which system 400 is deployed, within one or more cloud computing environments, or elsewhere.

Figure 4B:
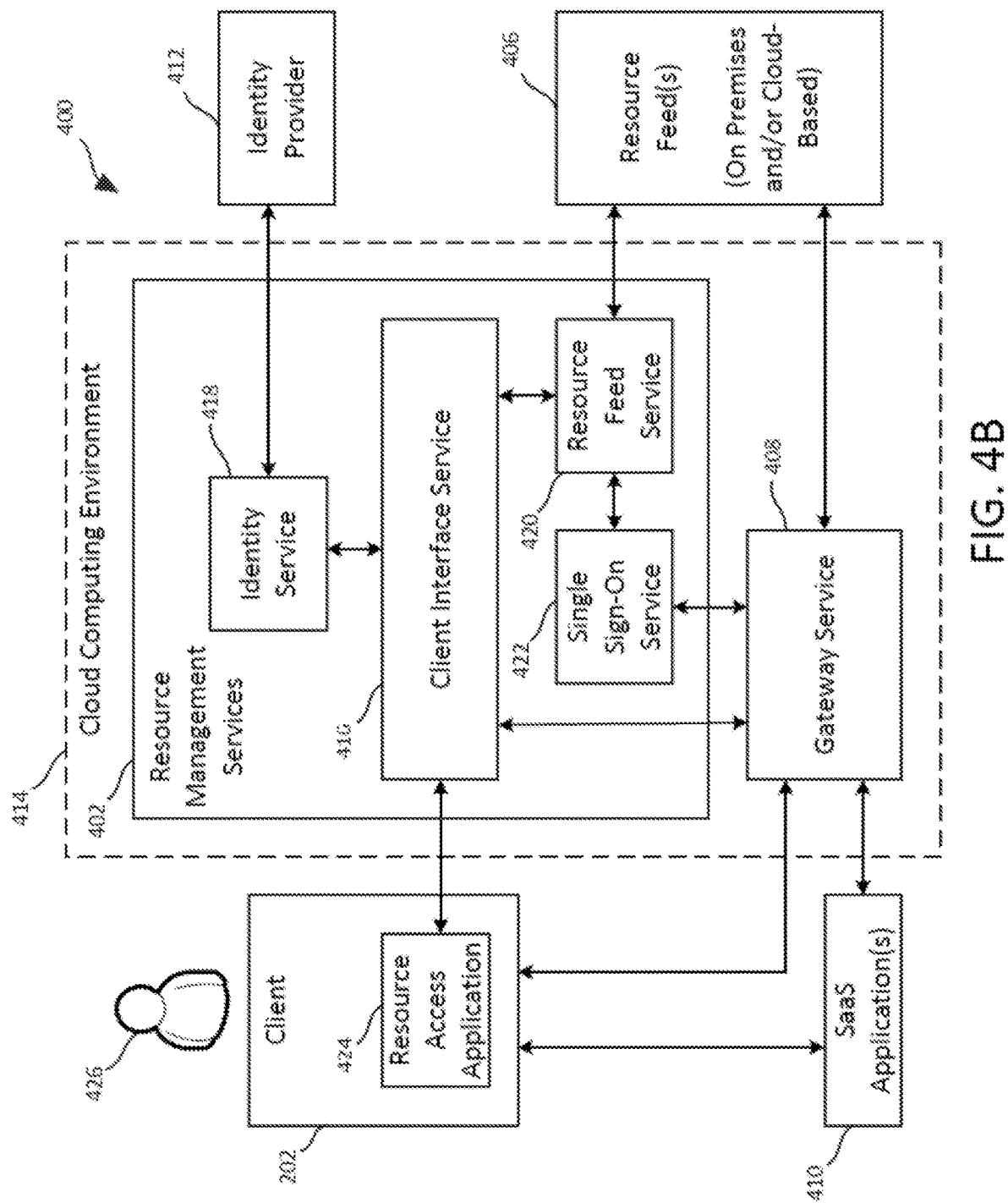
FIG. 4B is a block diagram showing an illustrative implementation of the system shown in FIG. 4A in which various resource management services as well as a gateway service are located within a cloud computing environment.

FIG. 4B is a block diagram showing an illustrative implementation of system 400 shown in FIG. 4A in which various resource management services 402 as well as gateway service 408 are located within a cloud computing environment 414. The cloud computing environment may, for example, include Microsoft Azure Cloud, Amazon Web Services, Google Cloud, or IBM Cloud.

For any of illustrated components (other than client 202) that are not based within cloud computing environment 414, cloud connectors (not shown in FIG. 4B) may be used to interface those components with cloud computing environment 414. Such cloud connectors may, for example, run on Windows Server instances hosted in resource locations and may create a reverse proxy to route traffic between the site(s) and cloud computing environment 414. In the illustrated example, the cloud-based resource management services 402 include a client interface service 416, an identity service 418, a resource feed service 420, and a single sign-on service 422. As shown, in some embodiments, client 202 may use a resource access application 424 to communicate with client interface service 416 as well as to present a user interface on client 202 that a user 426 can operate to access resource feed(s) 406 and/or SaaS application(s) 410. Resource access application 424 may either be installed on client 202 or may be executed by client interface service 416 (or elsewhere in system 400) and accessed using a web browser (not shown in FIG. 4B) on client 202.

As explained in more detail below, in some embodiments, resource access application 424 and associated components may provide user 426 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When resource access application 424 is launched or otherwise accessed by user 426, client interface service 416 may send a sign-on request to identity service 418. In some embodiments, identity provider 412 may be located on the premises of the organization for which system 400 is deployed. Identity provider 412 may, for example, correspond to an on-premises Windows Active Directory. In such embodiments, identity provider 412 may be connected to the cloud-based identity service 418 using a cloud connector (not shown in FIG. 4B), as described above. Upon receiving a sign-on request, identity service 418 may cause resource access application 424 (via client interface service 416) to prompt user 426 for the user's authentication credentials (e.g., username and password). Upon receiving the user's authentication credentials, client interface service 416 may pass the credentials along to identity service 418, and identity service 418 may, in turn, forward them to identity provider 412 for authentication, for example, by comparing them against an Active Directory domain. Once identity service 418 receives confirmation from identity provider 412 that the user's identity has been properly authenticated, client interface service 416 may send a request to resource feed service 420 for a list of subscribed resources for user 426.

In other embodiments (not illustrated in FIG. 4B), identity provider 412 may be a cloud-based identity service, such as a Microsoft Azure Active Directory. In such embodiments, upon receiving a sign-on request from client interface service 416, identity service 418 may, via client interface service 416, cause client 202 to be redirected to the cloud-based identity service to complete an authentication process. The cloud-based identity service may then cause client 202 to prompt user 426 to enter the user's authentication credentials. Upon determining the user's identity has been properly authenticated, the cloud-based identity service may send a message to resource access application 424 indicating the authentication attempt was successful, and resource access application 424 may then inform client interface service 416 of the successfully authentication. Once identity service 418 receives confirmation from client interface service 416 that the user's identity has been properly authenticated, client interface service 416 may send a request to resource feed service 420 for a list of subscribed resources for user 426.

For each configured resource feed, resource feed service 420 may request an identity token from single sign-on service 422. Resource feed service 420 may then pass the feed-specific identity tokens it receives to the points of authentication for the respective resource feeds 406. Each resource feed 406 may then respond with a list of resources configured for the respective identity. Resource feed service 420 may then aggregate all items from the different feeds and forward them to client interface service 416, which may cause resource access application 424 to present a list of available resources on a user interface of client 202. The list of available resources may, for example, be presented on the user interface of client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on client 202, and/or one or more SaaS applications 410 to which user 426 has subscribed. The lists of local applications and SaaS applications 410 may, for example, be supplied by resource feeds 406 for respective services that manage which such applications are to be made available to user 426 via resource access application 424. Examples of SaaS applications 410 that may be managed and accessed as described herein include Microsoft Office 365 applications, SAP SaaS applications, Workday applications, etc.

For resources other than local applications and SaaS application(s) 410, upon user 426 selecting one of the listed available resources, resource access application 424 may cause client interface service 416 to forward a request for the specified resource to resource feed service 420. In response to receiving such a request, resource feed service 420 may request an identity token for the corresponding feed from single sign-on service 422. Resource feed service 420 may then pass the identity token received from single sign-on service 422 to client interface service 416 where a launch ticket for the resource may be generated and sent to resource access application 424. Upon receiving the launch ticket, resource access application 424 may initiate a secure session to gateway service 408 and present the launch ticket. When gateway service 408 is presented with the launch ticket, it may initiate a secure session to the appropriate resource feed and present the identity token to that feed to seamlessly authenticate user 426. Once the session initializes, client 202 may proceed to access the selected resource.

When user 426 selects a local application, resource access application 424 may cause the selected local application to launch on client 202. When user 426 selects SaaS application 410, resource access application 424 may cause client interface service 416 request a one-time uniform resource locator (URL) from gateway service 408 as well a preferred browser for use in accessing SaaS application 410. After gateway service 408 returns the one-time URL and identifies the preferred browser, client interface service 416 may pass that information along to resource access application 424. Client 202 may then launch the identified browser and initiate a connection to gateway service 408. Gateway service 408 may then request an assertion from single sign-on service 422. Upon receiving the assertion, gateway service 408 may cause the identified browser on client 202 to be redirected to the logon page for identified SaaS application 410 and present the assertion. The SaaS may then contact gateway service 408 to validate the assertion and authenticate user 426. Once the user has been authenticated, communication may occur directly between the identified browser and the selected SaaS application 410, thus allowing user 426 to use client 202 to access the selected SaaS application 410.

In some embodiments, the preferred browser identified by gateway service 408 may be a specialized browser embedded in resource access application 424 (when the resource application is installed on client 202) or provided by one of the resource feeds 406 (when resource access application 424 is located remotely), e.g., via a secure browser service. In such embodiments, SaaS applications 410 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 406) for assessment of its security risk by a web filtering service. For approved URLs, the specialized browser may be permitted to access the link. For suspicious links, however, the web filtering service may have client interface service 416 send the link to a secure browser service, which may start a new virtual browser session with client 202, and thus allow the user to access the potentially harmful linked content in a safe environment.

In some embodiments, in addition to or in lieu of providing user 426 with a list of resources that are available to be accessed individually, as described above, user 426 may instead be permitted to choose to access a streamlined feed of event notifications and/or available actions that may be taken with respect to events that are automatically detected with respect to one or more of the resources. This streamlined resource activity feed, which may be customized for each user 426, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify user 426 of something that requires the user's attention (e.g., approval of an expense report, new course available for registration, etc.).

Figure 4C:
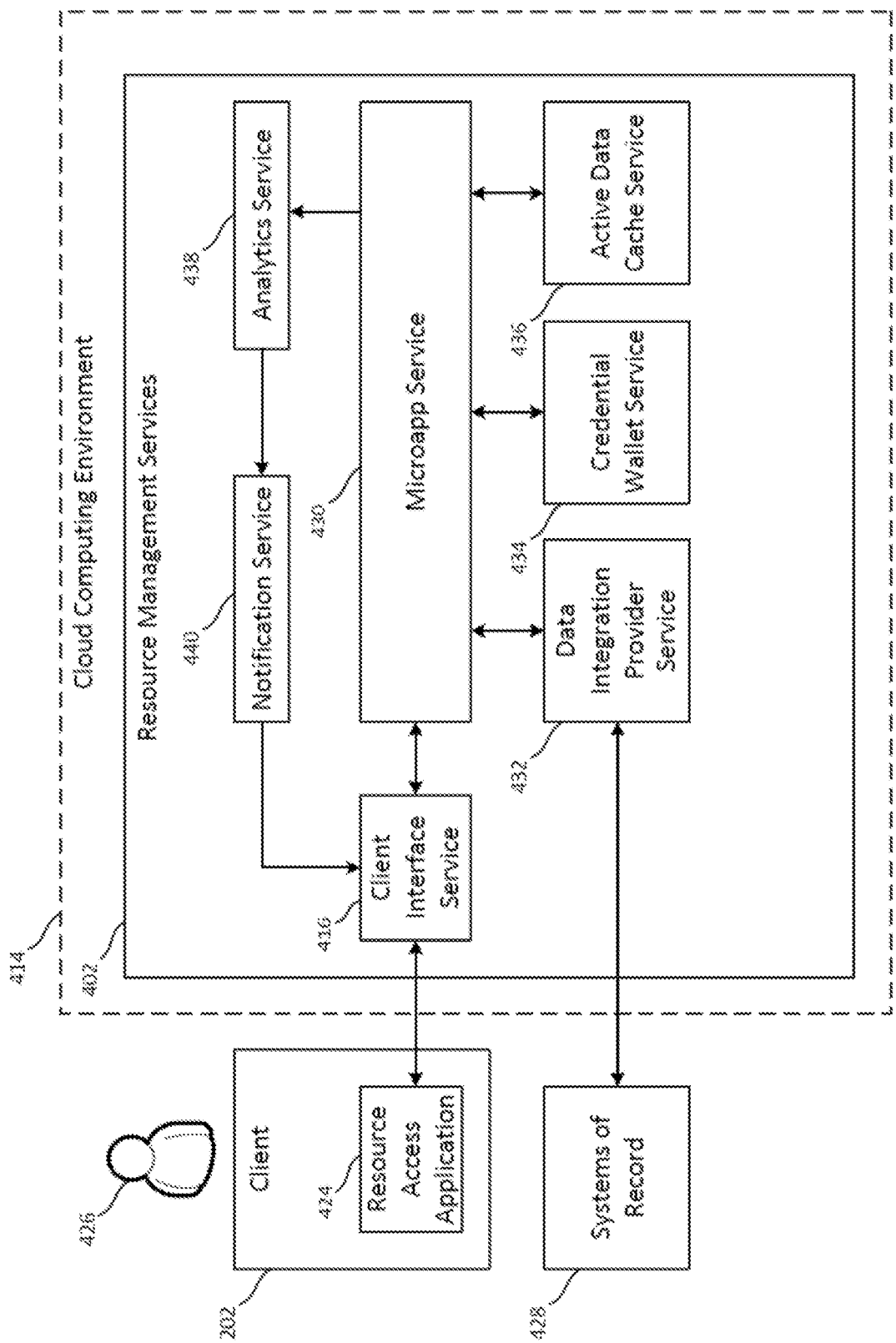
FIG. 4C is a block diagram similar to FIG. 4B but in which the available resources are represented by a single box labeled "systems of record," and further in which several different services are included among the resource management services.

FIG. 4C is a block diagram similar to that shown in FIG. 4B but in which the available resources (e.g., SaaS applications, web applications, Windows applications, Linux applications, desktops, file repositories and/or file sharing systems, and other data) are represented by a single box 428 labeled "systems of record," and further in which several different services are included within the resource management services block 402. As explained below, the services shown in FIG. 4C may enable the provision of a streamlined resource activity feed and/or notification process for client 202. In the example shown, in addition to client interface service 416 discussed above, the illustrated services include a microapp service 430, a data integration provider service 432, a credential wallet service 434, an active data cache service 436, an analytics service 438, and a notification service 440. In various embodiments, the services shown in FIG. 4C may be employed either in addition to or instead of the different services shown in FIG. 4B.

In some embodiments, a microapp may be a single use case made available to users to streamline functionality from complex enterprise applications. Microapps may, for example, utilize APIs available within SaaS, web, or home-grown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within resource access application 424 without having to launch the native application. The system shown in FIG. 4C may, for example, aggregate relevant notifications, tasks, and insights, and thereby give user 426 a dynamic productivity tool. In some embodiments, the resource activity feed may be intelligently populated by utilizing machine learning and artificial intelligence (AI) algorithms. Further, in some implementations, microapps may be configured within cloud computing environment 414, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 4C, systems of record 428 may represent the applications and/or other resources resource management services 402 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. Resource management services 402, and in particular data integration provider service 432, may, for example, support REST API, JSON, OData-JSON, and 6ML. As explained in more detail below, data integration provider service 432 may also write back to the systems of record, for example, using OAuth2 or a service account.

In some embodiments, microapp service 430 may be a single-tenant service responsible for creating the microapps. Microapp service 430 may send raw events, pulled from systems of record 428, to analytics service 438 for processing. The microapp service may, for example, periodically pull active data from systems of record 428.

In some embodiments, active data cache service 436 may be single-tenant and may store all configuration information and microapp data. It may, for example, utilize a per-tenant database encryption key and per-tenant database credentials.

In some embodiments, credential wallet service 434 may store encrypted service credentials for systems of record 428 and user OAuth2 tokens.

In some embodiments, data integration provider service 432 may interact with systems of record 428 to decrypt end-user credentials and write back actions to systems of record 428 under the identity of the end-user. The write-back actions may, for example, utilize a user's actual account to ensure all actions performed are compliant with data policies of the application or other resource being interacted with.

In some embodiments, analytics service 438 may process the raw events received from microapps service 430 to create targeted scored notifications and send such notifications to notification service 440.

Finally, in some embodiments, notification service 440 may process any notifications it receives from analytics service 438. In some implementations, notification service 440 may store the notifications in a database to be later served in a notification feed. In other embodiments, notification service 440 may additionally or alternatively send the notifications out immediately to client 202 as a push notification to user 426.

In some embodiments, a process for synchronizing with systems of record 428 and generating notifications may operate as follows. Microapp service 430 may retrieve encrypted service account credentials for systems of record 428 from credential wallet service 434 and request a sync with data integration provider service 432. Data integration provider service 432 may then decrypt the service account credentials and use those credentials to retrieve data from systems of record 428. Data integration provider service 432 may then stream the retrieved data to microapp service 430. Microapp service 430 may store the received systems of record data in active data cache service 436 and also send raw events to analytics service 438. Analytics service 438 may create targeted scored notifications and send such notifications to notification service 440. Notification service 440 may store the notifications in a database to be later served in a notification feed and/or may send the notifications out immediately to client 202 as a push notification to user 426.

In some embodiments, a process for processing a user-initiated action via a microapp may operate as follows. Client 202 may receive data from microapp service 430 (via client interface service 416) to render information corresponding to the microapp. Microapp service 430 may receive data from active data cache service 436 to support that rendering. User 426 may invoke an action from the microapp, causing resource access application 424 to send that action to microapp service 430 (via client interface service 416). Microapp service 430 may then retrieve from credential wallet service 434 an encrypted Oauth2 token for the system of record for which the action is to be invoked and may send the action to data integration provider service 432 together with the encrypted Oath2 token. Data integration provider service 432 may then decrypt the Oath2 token and write the action to the appropriate system of record under the identity of user 426. Data integration provider service 432 may then read back changed data from the written-to system of record and send that changed data to microapp service 430. Microapp service 432 may then update active data cache service 436 with the updated data and cause a message to be sent to resource access application 424 (via client interface service 416) notifying user 426 that the action was successfully completed.

In some embodiments, in addition to or in lieu of the functionality described above, resource management services 402 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, resource management services 402 may enable virtual assistance functionality that allows users to remain productive and take quick actions. Users may, for example, interact with the "Virtual Assistant" and ask questions such as "What is Bob Smith's phone number?" or "What absences are pending my approval?" Resource management services 402 may, for example, parse these requests and respond because they are integrated with multiple systems on the backend. In some embodiments, users may be able to interact with the virtual assistance through either resource access application 424 or directly from another resource, such as Microsoft Teams. This feature may allow employees to work efficiently, stay organized, and deliver only the specific information they're looking for.

Figure 5A:
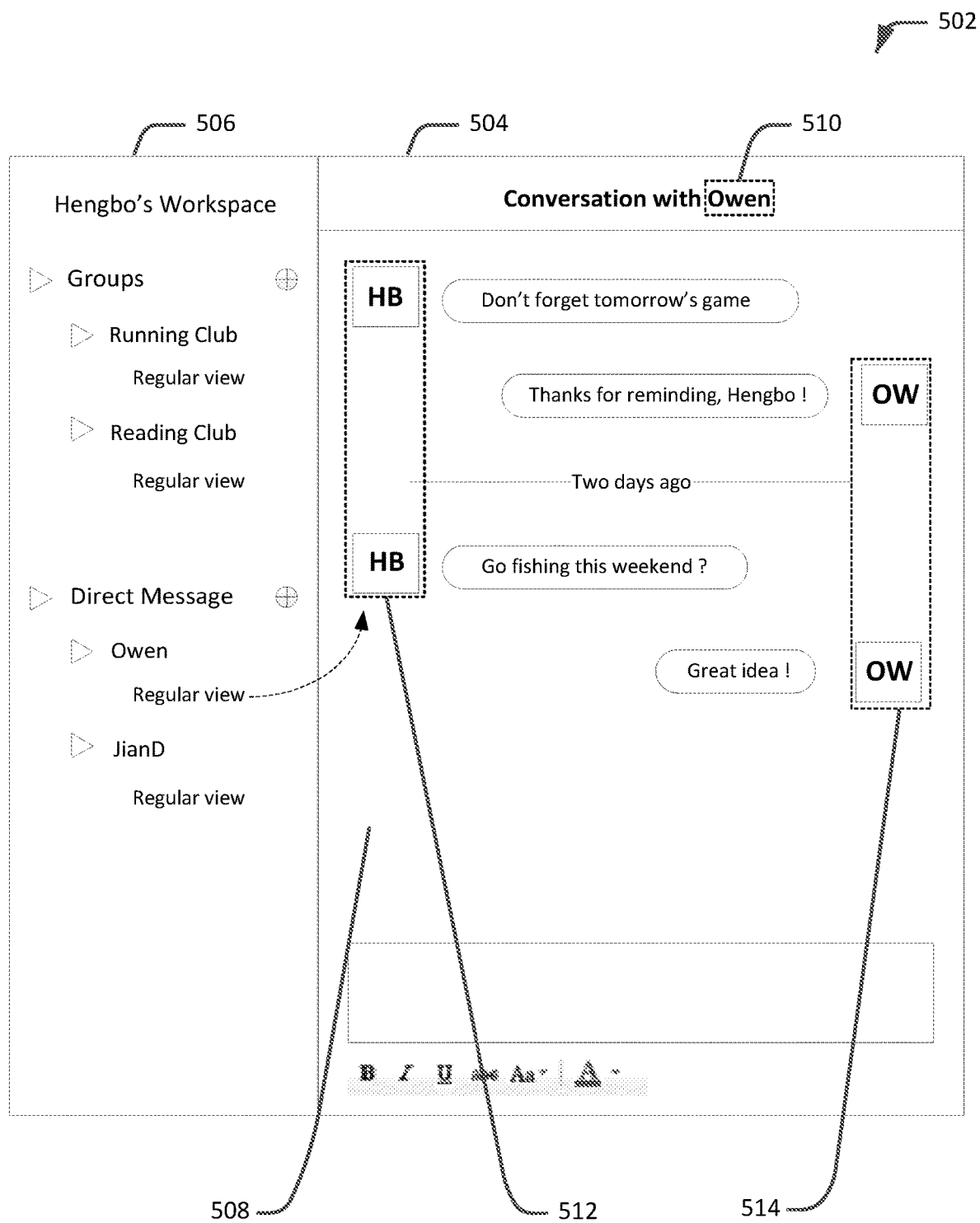
FIG. 5A is a diagram of an example non-confidential messaging view of a messaging application.

FIG. 5A is a diagram of an example non-confidential messaging view 502 of a messaging application. A messaging application associated with a client computing device, such as a messaging application 702 which will be further described below at least in conjunction with FIGS. 7, 8, 9A, and 9B, may display non-confidential messaging view 502 in or as part of a messaging window when its user is participating in a messaging conversation with another peer messaging participant. For example, as shown in FIG. 5A, non-confidential messaging view 502 includes a title bar 504, a side navigation region 506, and a message viewing region 508.

Title bar 504 includes a name or title of non-confidential messaging view 502. For example, as shown in FIG. 5A, title bar 504 includes the text "Conversation with Owen" to indicate that non-confidential messaging view 502 is being used by the user to participate in a messaging conversation with a peer messaging participant having or identified by a name "Owen". As can be seen in title bar 504, the peer messaging participant identity information "Owen" (see reference numeral 510) is not obfuscated but, rather, displayed in title bar 504 in a form that is intelligible to a viewer of non-confidential messaging view 502. In other words, a person viewing the text displayed in title bar 504 of non-confidential messaging view 502 can discern or otherwise determine that the messages displayed in non-confidential window 502 are between the user of messaging application 702 and a peer messaging participant who has or is identified by the name "Owen".

Side navigation region 506 can include various widgets (e.g., links, menu options, dropdown boxes, etc.) for manipulating non-confidential messaging view 502, starting or stopping a messaging conversation, and/or otherwise controlling the messaging conversation. For example, as shown in FIG. 5A, side navigation region 506 includes a title "Hengbo's Workspace", which may indicate that the user of non-confidential messaging view 502 is named Hengbo, and that non-confidential messaging view 502 is associated with Hengbo's workspace. For example, as indicated by the titles in title bar 504 and side navigation region 506, a user named or otherwise identified as Hengbo may be participating in a messaging conversation with a peer messaging participant named or otherwise identified as Owen.

With continued reference to the example of FIG. 5A, side navigation region 506 also includes dropdown buttons labeled "Groups" and "Direct Message". Clicking the "Groups" dropdown button displays a list of Hengbo's group messaging conversations and clicking the "Direct Message" dropdown button displays a list of Hengbo's peer-to-peer messaging conversations. As can be seen in FIG. 5A, Hengbo's group messaging conversations lists dropdown buttons labeled "Running Club" (group messaging conversation with a group of peers named or otherwise identified as "Running Club") and "Reading Club" (group messaging conversation with a group of peers named or otherwise identified as "Reading Club"). Hengbo's peer-to-peer messaging conversations lists dropdown buttons labeled "Owen" (peer-to-peer messaging conversation with a peer messaging participant named or otherwise identified as "Owen") and "JianD" (peer-to-peer messaging conversation with a peer messaging participant named or otherwise identified as "JianD"). Clicking on a dropdown button for a listed messaging conversation lists the messaging views generated and available for the particular messaging conversation. For example, as can be seen in FIG. 5A, as indicated by the links labeled "Regular view", a non-confidential messaging view, such as non-confidential messaging view 502, has been generated and is available for the listed messaging conversations.

Message viewing region 508 displays the non-confidential messages in a non-confidential messaging conversation. In the example of FIG. 5A, message viewing region 508 displays the non-confidential messages in the non-confidential peer-to-peer messaging conversation between Hengbo and Owen. As can be seen by the avatars of the messaging participants Hengbo and Owen in message viewing region 508 (see reference numerals 512 and 514), the avatars representing messaging participants Hengbo (avatar box labeled "HB") and Owen (avatar box labeled "OW") are not obfuscated but, rather, displayed in message viewing region 508 in a form that is intelligible to a viewer of non-confidential messaging view 502. In other words, a person viewing the avatars displayed in message viewing region 508 of non-confidential messaging view 502 can clearly view the avatars representing the messaging participants in the messaging conversation shown in non-confidential messaging view 502. In other words, a person viewing the avatars displayed in message viewing region 508 can discern the avatars of messaging participants Hengbo and Owen.

Figure 5B:
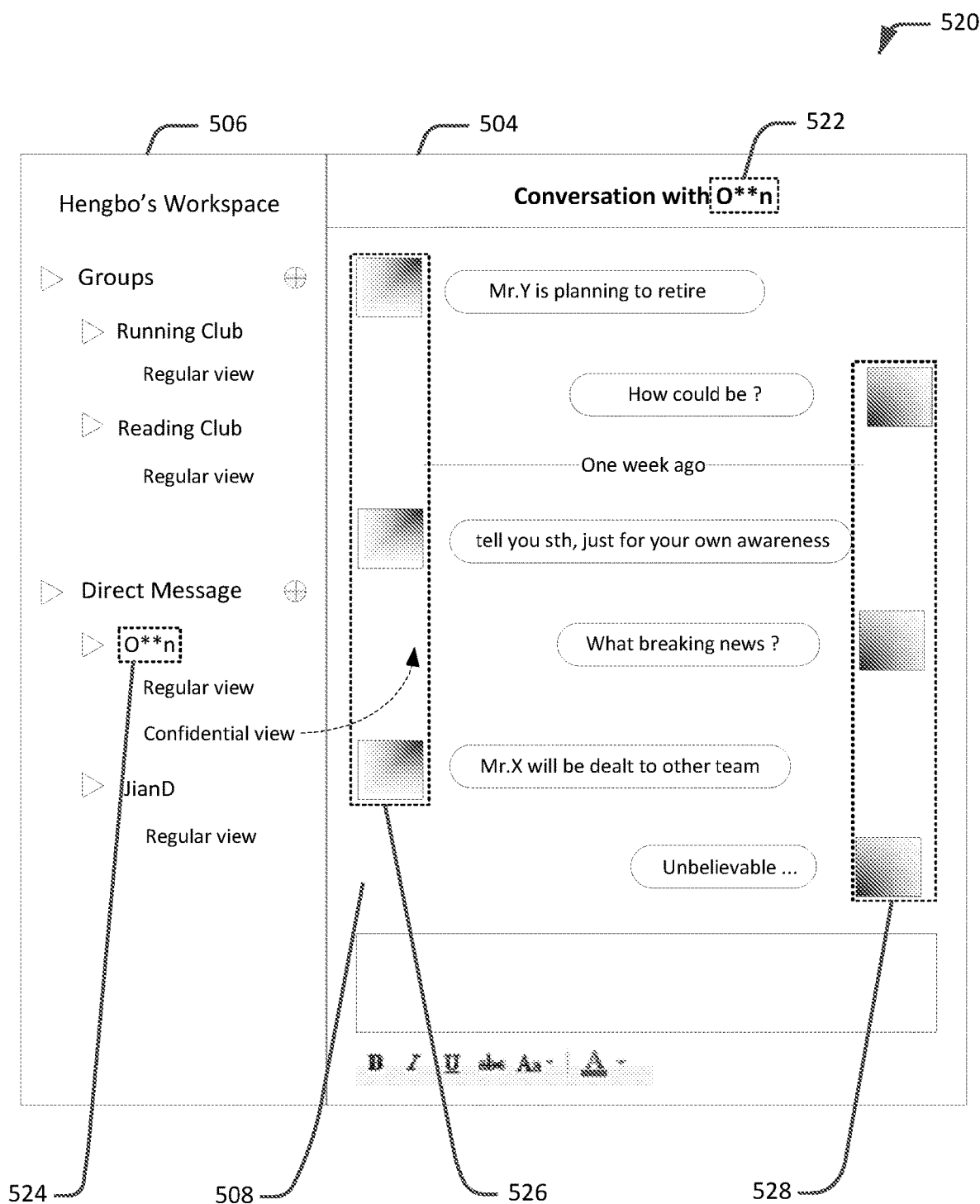
FIG. 5B is a diagram of an example confidential messaging view of the messaging application of FIG. 5A, in accordance with an embodiment of the present disclosure.

FIG. 5B is a diagram of an example confidential messaging view 520 of messaging application 702 of FIG. 5A, in accordance with an embodiment of the present disclosure. Confidential messaging view 520 shown in FIG. 5B is similar to non-confidential messaging view 502 shown in FIG. 5A, except that certain of the information displayed in title bar 504, side navigation region 506, and message viewing region 508 are obfuscated to hide or otherwise conceal the identities of messaging participants in confidential messaging conversations, as further described below. In the example of FIG. 5B, confidential messaging view 520 is associated with a confidential messaging conversation between messaging participants named or otherwise identified as Hengbo and Owen.

As previously explained, to send a confidential message to Owen, Hengbo may activate a control mechanism to request the display of and access to confidential messaging view 520. For example, in an implementation, messaging application 702 can provide such control mechanism as a widget (not shown) in non-confidential messaging view 502 being used by Hengbo in the non-confidential peer-to-peer messaging conversation with peer messaging participant Owen. Messaging application 702 may also display confidential messaging view 520 in response to receipt of a confidential message to Hengbo from peer messaging participant Owen.

As can be seen in FIG. 5B, the peer messaging participant identity information is obfuscated in title bar 504 and is displayed as "On" (see reference numeral 522). In particular, since confidential messaging view 520 displays confidential messages between Hengbo and peer messaging participant Owen, the peer messaging participant identity information, "Owen" is displayed in a partially hidden form, "On", where the middle letters "we" are replaced by "" to obfuscate (hide) the identity of the peer messaging participant. Also, since there is now a confidential peer-to-peer messaging conversation between Hengbo and Owen, the label of the dropdown button displayed in side navigation region 506 for Hengbo's peer-to-peer messaging conversation with Owen is displayed in obfuscated form (see reference numeral 524). For example, in an implementation, messaging application 702 can display the label of the dropdown button for Hengbo's peer-to-peer messaging conversation with Owen in side navigation region 506 in a partially hidden form similar to the manner displayed in title bar 504. Note that a link labeled "Confidential view" is displayed under the dropdown button labeled "On" to indicate that a confidential messaging view (confidential messaging view 520) has been generated for the confidential peer-to-peer messaging conversation between Hengbo and Owen.

Still referring to FIG. 5B, as can be seen in message viewing region 508 which displays the confidential messages in the confidential peer-to-peer messaging conversation between Hengbo and Owen, the avatars representing messaging participants Hengbo (see reference numeral 526) and Owen (see reference numeral 528) are displayed in obfuscated form. For example, in an implementation, messaging application 702 can replace the avatars representing Hengbo and Owen with random bitmaps and display the random bitmaps instead of the avatars in message viewing region 508. As a result, in contrast to the display of the avatars representing Hengbo and Owen in non-confidential messaging view 502, a person viewing the random bitmaps or other concealing image displayed in message viewing region 508 of confidential messaging view 520 is not able to view the avatars representing the messaging participants. Since the messaging participant identity information is at least partially hidden or completely hidden in confidential messaging view 520, the display of confidential messaging view 520 does not expose the identities of Hengbo and Owen. However, since the peer messaging participant identity information is partially hidden, the user of confidential messaging view 520 is able to realize who the other messaging participant is in the confidential messaging conversation.

Figure 6:
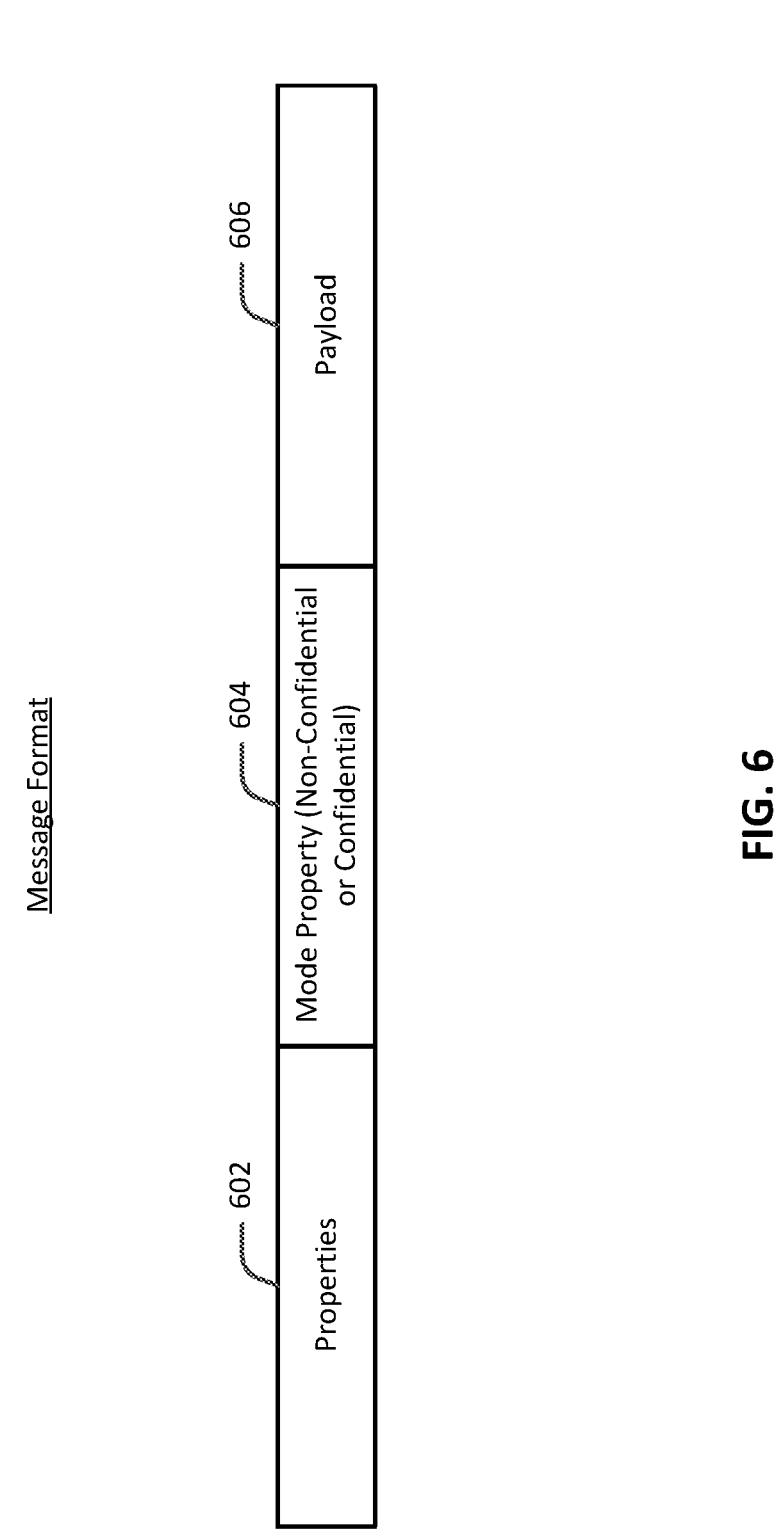
FIG. 6 is a diagram illustrating an example message format, in accordance with an embodiment of the present disclosure.

FIG. 6 is a diagram illustrating an example message format 600, in accordance with an embodiment of the present disclosure. Message format 600 may represent a message being sent between two or more endpoints of a messaging conversation. As shown, message format 600 includes properties 602, a mode property 604, and a payload 606. Properties 602 identify the properties of the message and includes information, such as, for example, source and destination addresses, a sequence number, a timestamp, a source identifier, payload type, and so on. Mode property 604 identifies the type of message and includes information to identify the message as non-confidential ("Non-Confidential") or confidential ("Confidential"). Payload 606 corresponds to the actual data being sent in the message and includes the message content.

Figure 7:
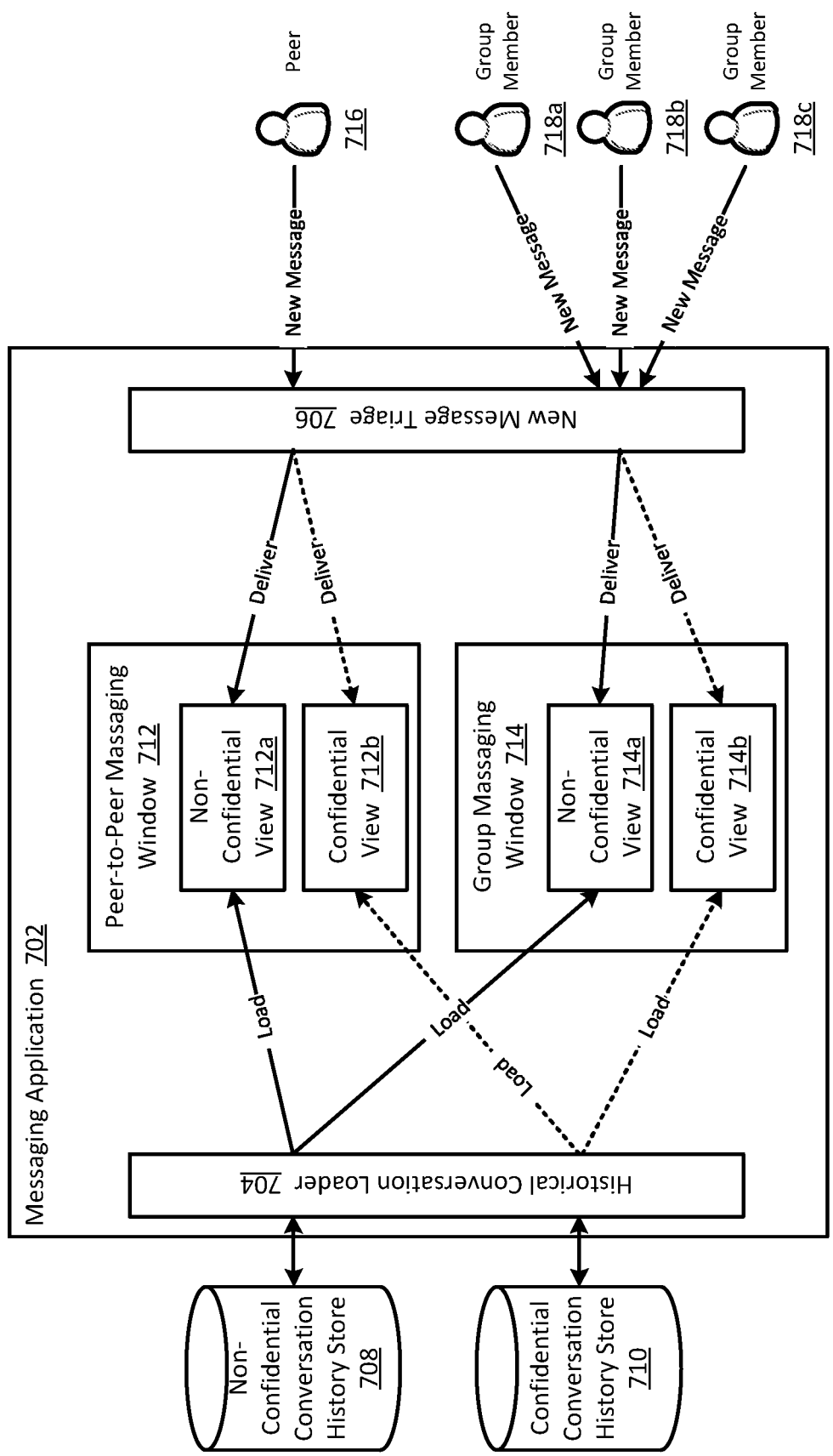
FIG. 7 is a diagram showing example delivery and loading of messages by a messaging application, in accordance with an embodiment of the present disclosure.

FIG. 7 is a diagram showing example delivery and loading of messages by messaging application 702, in accordance with an embodiment of the present disclosure. For example, messaging application 702 may be configured to run on a client device (e.g., client machine 102 of FIG. 1 and/or client 202 of FIGS. 4A-4C) and allow a user of the client device to participate in one or more peer-to-peer and/or group messaging conversations. As shown, messaging application 702 includes a historical conversation loader 704 and a new message triage 706. In an implementation, historical conversation loader 704 and new message triage 706 may be execution threads of messaging application 702 instance running on the client device.

Historical conversation loader 704 is configured to load the historical messages into appropriate non-confidential messaging views or confidential messaging views based on the mode property of the historical messages. Here, the historical messages include both the messages sent by the user and messages received by the user. Also, the historical messages are loaded into the appropriate non-confidential messaging views or confidential messaging views based on the messaging conversations to which the historical messages belong. The historical messages may be loaded from a non-confidential conversation history store 708 and a confidential conversation history store 710. Non-confidential conversation history store 708 may store the non-confidential historical messages and confidential conversation history store 710 may store the confidential historical messages. Non-confidential conversation history store 708 and confidential conversation history store 710 may include any type of computer-readable storage media configured for short-term or long-term storage of data. Non-confidential conversation history store 708 and/or confidential conversation history store 710 may be provided on the client device (e.g., local to client application 702) or provided separately or remotely from the client device (e.g., on a remote server device).

Messaging application 702 may generate a peer-to-peer messaging window for each peer-to-peer messaging conversation of the user. The peer-to-peer messaging window may include a non-confidential messaging view for the non-confidential messages in the peer-to-peer messaging conversation (in which case, the peer-to-peer messaging conversation may be referred to as a non-confidential peer-to-peer messaging conversation) and a confidential messaging view for the confidential messages in the peer-to-peer messaging conversation (in which case, the peer-to-peer messaging conversation may be referred to as a confidential peer-to-peer messaging conversation). In a similar manner, messaging application 702 may generate a group messaging window for each group messaging conversation of the user and, within each group messaging window, a non-confidential messaging view for the non-confidential messages in the group messaging conversation (in which case, the group messaging conversation may be referred to as a non-confidential group messaging conversation) and a confidential messaging view for the confidential messages in the group messaging conversation (in which case, the group messaging conversation may be referred to as a confidential group messaging conversation).

For instance, in the example of FIG. 7, messaging application 702 may have generated a peer-to-peer messaging window 712 for the user's peer-to-peer messaging conversation with a peer messaging participant 716. Messaging application 702 may have also generated a non-confidential messaging view 712a and a confidential messaging view 712b for the user's peer-to-peer messaging conversation with peer messaging participant 716. Further, messaging application 702 may have generated a group messaging window 714 for the user's group messaging conversation with a group of peer messaging participants comprised of the user and group members 718a-718c. Messaging application 702 may have also generated a non-confidential messaging view 714a and a confidential messaging view 714b for the user's group messaging conversation with group members 718a-718c.

Continuing the example above, historical conversation loader 704 can then load the user's non-confidential historical messages from non-confidential conversation history store 708 by identifying the non-confidential conversation messages belonging to the user's messaging conversation with peer messaging participant 716 and load the identified non-confidential messages into non-confidential messaging view 712a. Historical conversation loader 704 can also identify the non-confidential messages belonging to the user's messaging conversation with group members 718a-718c and load the identified non-confidential messages into non-confidential messaging view 714a. In a similar manner, historical conversation loader 704 can load the user's confidential historical messages from confidential conversation history store 710 by identifying the confidential messages belonging to the user's messaging conversation with peer messaging participant 716 and load the identified confidential messages into confidential messaging view 712b. Historical conversation loader 704 can also identify the confidential messages belonging to the user's messaging conversation with group members 718a-718c and load the identified confidential messages into confidential messaging view 714b. Note that historical conversation loader 704 can load the user's historical messages (both non-confidential and confidential) belonging to the user's messaging conversations with other peers or groups of peers in a similar manner as to that described above.

With continued reference to FIG. 7, new message triage 706 is configured to deliver received messages to the appropriate messaging view based on a mode property included with the messages. For instance, in the example of FIG. 7, messaging application 702 may receive a message for the user from peer messaging participant 716 and new message triage 706 may deliver the received message based on the mode property included with the received message. For example, if the mode property indicates that the received message is a non-confidential message, new message triage 706 can deliver the received message to non-confidential messaging view 712a of peer-to-peer messaging window 712. Otherwise, if the mode property indicates that the received message is a confidential message, new message triage 706 can deliver the received message to confidential messaging view 712b of peer-to-peer messaging window 712. Messaging application 702 may similarly receive a message for the user from any one of group members 718a-718c and new message triage 706 may deliver the received message based on the mode property included with the received message. For example, if the mode property indicates that the received message is a non-confidential message, new message triage 706 can deliver the received message to non-confidential messaging view 714a of group messaging window 714. Otherwise, if the mode property indicates that the received message is a confidential message, new message triage 706 can deliver the received message to confidential messaging view 714b of group messaging window 714.

Figure 8:
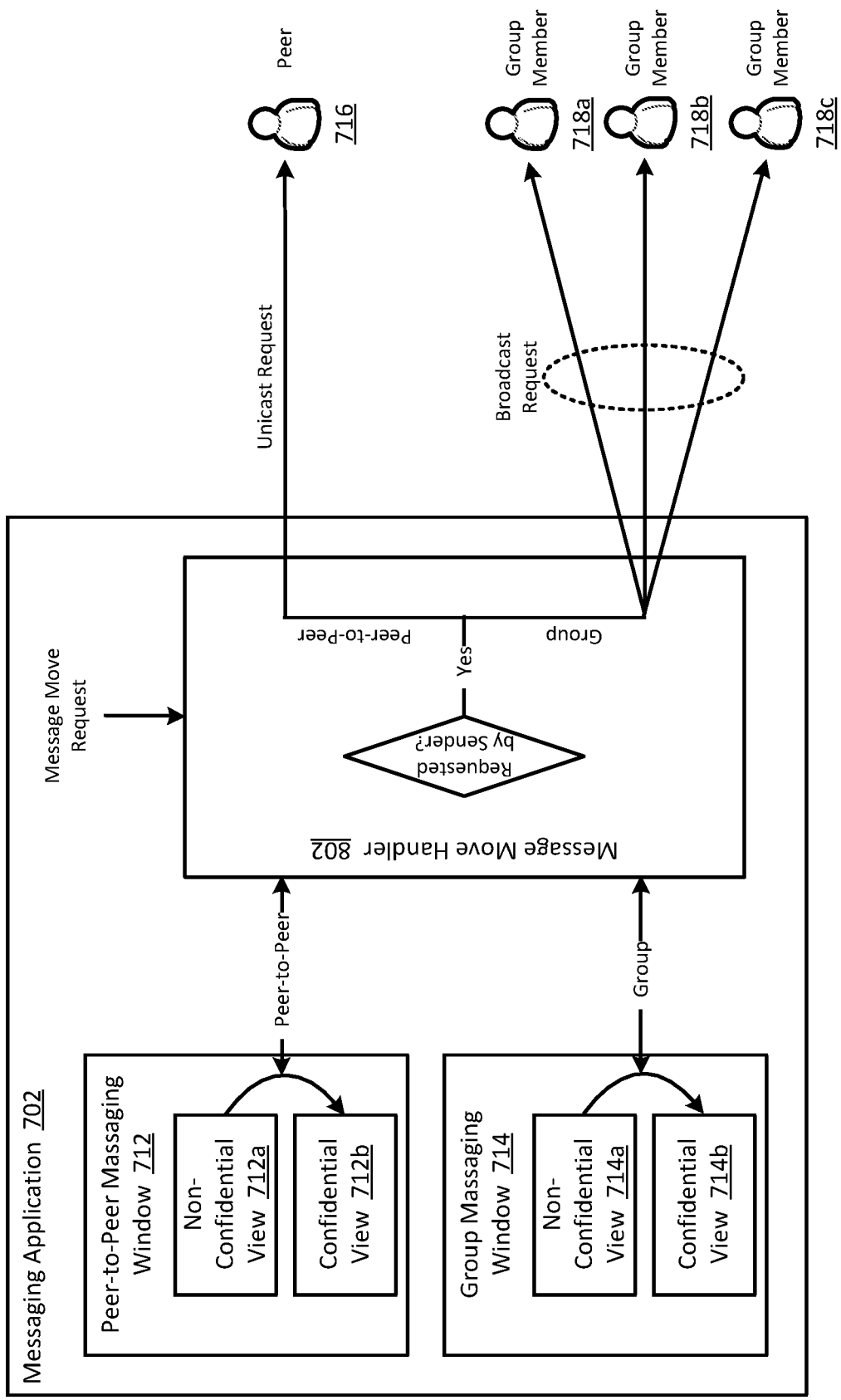
FIG. 8 is a diagram showing example movement of messages across views by the messaging application of FIG. 8, in accordance with an embodiment of the present disclosure.

FIG. 8 is a diagram showing example movement of messages across views by messaging application 702 of FIG. 7, in accordance with an embodiment of the present disclosure. In an implementation, messaging application 702 may provide a feature whereby a user can convert (change) a non-confidential message displayed in a non-confidential messaging view be a confidential message. Continuing the example above, the user may use non-confidential messaging view 712a of peer-to-peer messaging window 712 to send a non-confidential message to peer messaging participant 716. Shortly after sending the message, the user may realize that the message just sent is sensitive (private) and, thus, should have been a confidential message. To convert the recently sent non-confidential message to a confidential message, the user can select and move the recently sent non-confidential message from non-confidential messaging view 712a to confidential messaging view 712b. In response to the conversion of the recently sent message, messaging application 702 can send a notification of the message conversion to a messaging application instance of peer messaging participant 716. The messaging application instance of peer messaging participant 716 can then move the display of the received message from a non-confidential view to a confidential view. In an implementation, messaging application 702 may permit the conversion of a non-confidential message to a confidential message if performed or requested within a threshold period, such as 90 secs., 120 secs., 210 secs., or any other suitable time duration, within the sending of the non-confidential message. As will be appreciated in light of this disclosure, messaging application 702 does not support conversion of a confidential message to a non-confidential message since such a feature can be used to reveal (i.e., expose) the hidden identities of the messaging participants associated with the confidential message.

With continued reference to FIG. 8, to support such message conversion, messaging application 702 may include a message move handler 802. In an implementation, message move handler 802 may be an execution thread of messaging application 702 instance running on the client device. Message move handler 802 is configured to modify the mode property of a message in response to the message being converted from being non-confidential to confidential. For example, if a user converts a non-confidential message to a confidential message, message move handler 802 on the local machine (message move handler 802 on the user's machine) modifies the mode property of the message in non-confidential conversation history store 708 to indicate that the message is a confidential message. Message move handler 802 may move the converted message from non-confidential conversation history store 708 to confidential conversation history store 710. Modifying the mode property of the message in non-confidential conversation history store 708 allows historical conversation loader 704 to properly load the message as a confidential message into confidential messaging view 712b, for example. Message move handler 802 on the local machine may send a notification of the message conversion to the peer messaging participants (i.e., the intended recipients of the converted message).

In response to the message conversion notification, message move handler 802 on the peer machine can determine whether historical messages are stored on the peer machine (i.e., whether the conversation history is stored locally on the peer machine). If historical messages are stored on the peer machine, message move handler 802 on the peer machine can modify the mode property of the converted message in non-confidential conversation history store 708 to indicate that the converted message is a confidential message. In an implementation, message move handler 802 on the peer machine can notify historical conversation loader 704 on the peer machine of the conversion of the non-confidential message. In response to the notification, historical conversation loader 704 on the peer machine can load the converted message as a confidential message into confidential messaging view 712b.

Figure 9A:
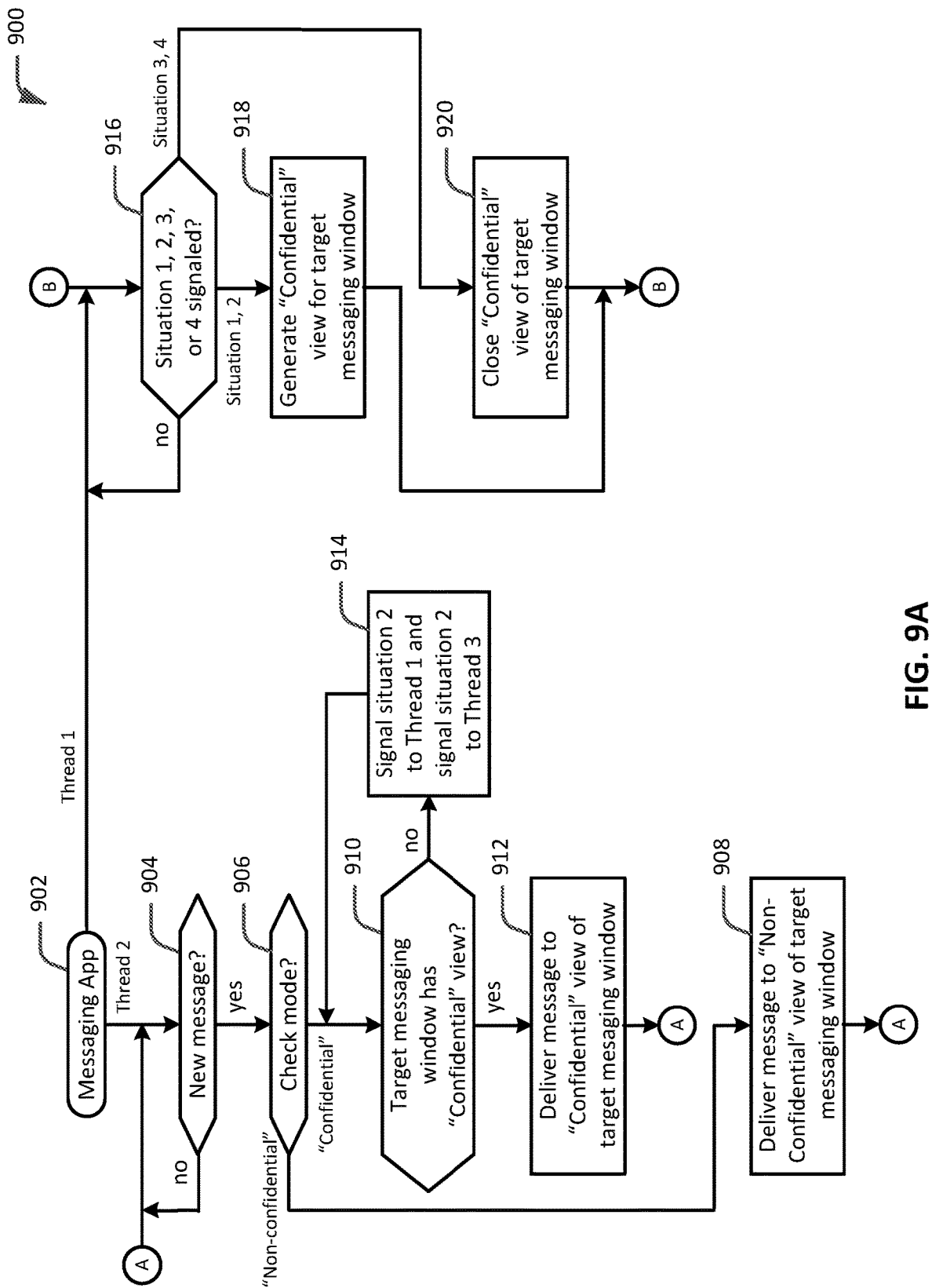
FIGS. 9A and 9B collectively show a flow diagram of an example process for providing messaging participant identity leak prevention during the display of messages, in accordance with an embodiment of the present disclosure.
Figure 9B:
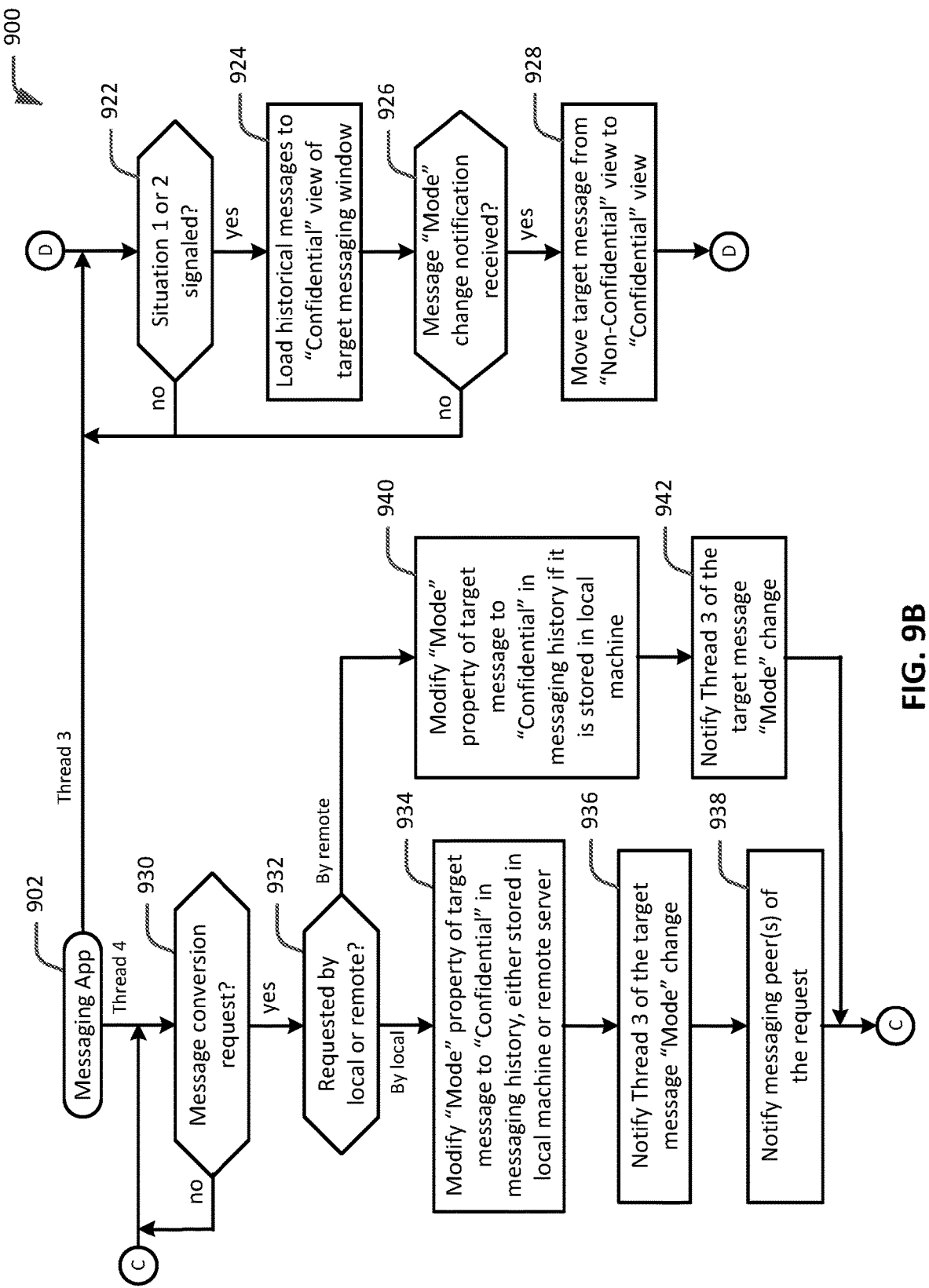

FIGS. 9A and 9B collectively show a flow diagram of an example process 900 for providing messaging participant identity leak prevention during the display of messages, in accordance with an embodiment of the present disclosure. Example process 900 may be implemented or used within a computing environment or system such as those disclosed above at least with respect to FIG. 1, FIG. 2, FIG. 3, and/or FIGS. 4A-4C. For example, in some embodiments, the operations, functions, or actions illustrated in example process 900 may be stored as computer-executable instructions in a computer-readable medium, such as volatile memory 122 and/or non-volatile memory 128 of computing device 100 of FIG. 2 (e.g., computer-readable medium of client machines 102 of FIG. 1, client machines 102a-102n of FIG. 3 and/or clients 202 of FIGS. 4A-4C). For example, the operations, functions, or actions described in the respective blocks of example process 900 may be implemented by applications 116 and/or data 117 of computing device 100.

With reference to FIGS. 9A and 9B, process 900 is initiated at 902 where a messaging application 702 may be running on a user's client device. For example, a user may run messaging application 702 on his or her client device to participate in a messaging conversation with one or more peer messaging participants. Process 900 illustrates some of the operations that may be performed by the instance of messaging application 702, which include, by way of example, the user requesting a confidential messaging view to send a confidential message or start a confidential messaging conversation (denoted in process 900 as "Situation 1"), the user receiving a message that was sent from a confidential messaging view of a peer messaging participant (denoted in process 900 as "Situation 2"), the user closing a confidential messaging view (denoted in process 900 as "Situation 3"), and the user deleting the last message displayed in a confidential messaging view (denoted in process 900 as "Situation 4").

Referring again to process 900, at 904, new message triage 706 of messaging application 702 may wait for a new message to triage. If there is a new message to triage, then, at 906, new message triage 706 may check the mode property of the new message.

If the mode property indicates that the new message is a non-confidential message, then, at 908, new message triage 706 may deliver the new message to a non-confidential messaging view of a target messaging window. Here, the target messaging window may be a peer-to-peer messaging window or a group messaging window that is associated with the messaging conversation to which the new message belongs. The new message may then be displayed in the non-confidential messaging view of the target messaging window as a non-confidential message. New message triage 706 may then wait for another message to triage.

Otherwise, if the mode property indicates that the new message is a confidential message, then, at 910, new message triage 706 may check to determine whether a confidential messaging view has been generated for the target messaging window. If a confidential messaging view has been generated for the target messaging window, then, at 912, new message triage 706 may deliver the new message to the confidential messaging view of the target messaging window. The new message may then be displayed in the confidential messaging view of the target messaging window as a confidential message. New message triage 706 may then wait for another message to triage.

If a confidential messaging view has not been generated for the target messaging window, then, at 914, new message triage 706 may signal messaging application 702 to generate a confidential messaging view for the target messaging window (denoted in 914 as "Signal situation 2 to Thread 1") and signal historical conversation loader 704 to load the historical messages into the generated confidential messaging view for the target messaging window (denoted in 914 as "Signal situation 2 to Thread 3"). Here, the historical messages are the historical confidential messages that are in the same confidential message thread to which the new message belongs. Once the confidential messaging view is generated and the historical messages loaded into the confidential messaging view, at 912, new message triage 706 may deliver the new message to the confidential messaging view of the target messaging window. The new message may then be displayed in the confidential messaging view of the target messaging window as a confidential message. New message triage 706 may then wait for another message to triage.

At 916, messaging application 702 may wait for a request from the user for a confidential messaging view for a target messaging window (denoted as "Situation 1"), a signal from new message triage 706 to generate a confidential messaging view for a target messaging window (denoted as "Situation 2"), the user closing a confidential messaging view of a target messaging window (denoted as "Situation 3"), or the user deleting the last message displayed in a confidential messaging view of a target messaging window (denoted as "Situation 4").

In response to situation 1 or situation 2, at 918, messaging application 702 may generate a confidential messaging view for the target messaging window. In response to situation 3 or situation 4, at 920, messaging application 702 may close the confidential messaging view of the target messaging window. For example, messaging application 702 may stop the display of the confidential messaging view in the target messaging window being displayed on the client device.

Referring now to FIG. 9B, at 922, historical conversation loader 704 of messaging application 702 may wait for a request from the user for a confidential messaging view for a target messaging window (denoted as "Situation 1") or a signal from new message triage 706 to generate a confidential messaging view for a target messaging window (denoted as "Situation 2"). In response to situation 1 or situation 2, at 924, messaging application 702 may load the historical messages into the generated confidential messaging view of the target messaging window. As described previously, the historical messages may be loaded from confidential conversation history store 710.

At 926, historical conversation loader 704 may check to determine whether a message mode change notification is received. For example, message move handler 802 may notify historical conversation loader 704 of a change to a mode property of a target message. If a message mode change notification is received, then, at 928, historical conversation loader 704 may move the target message (i.e., the message associated with the notification) from the non-confidential messaging view to the confidential messaging view of the target messaging window.

At 930, message move handler 802 of messaging application 702 may wait for a message conversion request. In response to a message conversion request, then, at 932, message move handler 802 may check to determine whether the request was generated on the local machine (e.g., request was generated by the user using the client device) or a remote machine (e.g., request was generated by a user using a different client device).

If the request was generated on the local machine, then, at 934, message move handler 802 may modify the mode property of the target message in non-confidential conversation history store 708. In an implementation, message move handler 802 may move the target message from non-confidential conversation history store 708 to confidential conversation history store 710. At 936, message move handler 802 may send a notification to historical conversation loader 704 of the mode change to the target message. At 938, message move handler 802 may notify the peer messaging participants of the message conversion request.

If the request was generated on a remote machine, then, at 940, message move handler 802 may modify the mode property of the target message in non-confidential conversation history store 708 if historical messages are stored on the remote machine. If historical messages are not stored on the remote machine, message move handler 802 does not modify the mode property of the target message. At 942, message move handler 802 may send a notification to historical conversation loader 704 of the mode change to the target message.

FURTHER EXAMPLE EMBODIMENTS

The following examples pertain to further embodiments, from which numerous permutations and configurations will be apparent.

Example 1 includes a method including: receiving, by a computing device, a message from a sender to a recipient via a software application running on the computing device, the software application having a non-confidential messaging view and a confidential messaging view; determining, by the computing device, a message type of the message, the message type is one of a non-confidential message or a confidential message; and displaying, by the computing device, the message in the confidential messaging view of the software application in response to a determination that the message type indicates a confidential message, the confidential messaging view being distinct from the non-confidential messaging view, wherein messaging participant identity information is obfuscated in the display of the message in the confidential messaging view.

Example 2 includes the subject matter of Example 1, wherein determining the message type is based on a mode property included with the message.

Example 3 includes the subject matter of any of Examples 1 and 2, wherein the message type is based on a type of view of the software application used by the sender to send the message to the recipient.

Example 4 includes the subject matter of any of Examples 1 through 3, wherein the software application is a conferencing application.

Example 5 includes the subject matter of any of Examples 1 through 3, wherein the software application is a messaging application.

Example 6 includes the subject matter of any of Examples 1 through 5, wherein the messaging participant identity information is partially hidden in the display of the message in the confidential messaging view.

Example 7 includes the subject matter of any of Examples 1 through 6, wherein an avatar representing the sender of the message is replaced with a random bitmap in the display of the message in the confidential messaging view.

Example 8 includes the subject matter of any of Examples 1 through 7, further including, responsive to receiving, by the computing device, a request to move a target message being displayed in the non-confidential messaging view to the confidential messaging view: changing the message type of the target message to indicate a confidential message; displaying the target message in the confidential messaging view; and removing the display of the target message from the non-confidential messaging view.

Example 9 includes the subject matter of Example 8, wherein changing the message type of the target message includes changing a mode property of the target message.

Example 10 includes the subject matter of any of Examples 8 and 9, wherein the target message is a part of a message thread, the method further including, responsive to receiving, by the computing device, a request to move the target message being displayed in the non-confidential messaging view to the confidential messaging view: changing the message type of messages in the message thread subsequent to the target message to indicate a confidential message; displaying the messages in the message thread subsequent to the target message in the confidential messaging view; and removing the display of the messages in the message thread subsequent to the target message from the non-confidential messaging view.

Example 11 includes the subject matter of any of Examples 8 through 10, further including, responsive to a determination, by the computing device, that the request to move the target message is by the sender of the target message, sending a notification of the request to move the target message to one or more recipients of the target message.

Example 12 includes a system including a memory and one or more processors in communication with the memory and configured to: receive a message from a sender to a recipient via a software application running on the computing device, the software application having a non-confidential messaging view and a confidential messaging view; determine a message type of the message, the message type is one of a non-confidential message or a confidential message; and display the message in the confidential messaging view of the software application in response to a determination that the message type indicates a confidential message such that messaging participant identity information is obfuscated in the display of the message in the confidential messaging view, wherein the confidential messaging view is distinct from the non-confidential messaging view.

Example 13 includes the subject matter of Example 12, wherein to determine the message type is based on a mode property included with the message.

Example 14 includes the subject matter of any of Examples 12 and 13, wherein the message type is based on a type of view of the software application used by the sender to send the message to the recipient.

Example 15 includes the subject matter of any of Examples 12 through 14, wherein the software application is a conferencing application.

Example 16 includes the subject matter of any of Examples 12 through 14, wherein the software application is a messaging application.

Example 17 includes the subject matter of any of Examples 12 through 16, wherein the messaging participant identity information is partially hidden in the display of the message in the confidential messaging view.

Example 18 includes the subject matter of any of Examples 12 through 17, wherein an avatar representing the sender of the message is replaced with a random bitmap in the display of the message in the confidential messaging view.

Example 19 includes the subject matter of any of Examples 12 through 17, wherein the one or more processors are further configured to, responsive to a request to move a target message being displayed in the non-confidential messaging view to the confidential messaging view: change the message type of the target message to indicate a confidential message; display the target message in the confidential messaging view; and remove the display of the target message from the non-confidential messaging view.

Example 20 includes the subject matter of Example 19, wherein to change the message type of the target message includes to change a mode property of the target message.

Example 21 includes the subject matter of any of Examples 19 and 20, wherein the target message is a part of a message thread, and the one or more processors are further configured to, responsive to a request to move the target message being displayed in the non-confidential messaging view to the confidential messaging view: change the message type of messages in the message thread subsequent to the target message to indicate a confidential message; display the messages in the message thread subsequent to the target message in the confidential messaging view; and remove the display of the messages in the message thread subsequent to the target message from the non-confidential messaging view.

Example 22 includes the subject matter of any of Examples 19 through 21, wherein the one or more processors are further configured to, responsive to a determination that the request to move the target message is by the sender of the target message, send a notification of the request to move the target message to one or more recipients of the target message.

Example 23 includes a method including: receiving, by a computing device, a message via a software application running on the computing device; responsive to a determination, by the computing device, that the message is a non-confidential message, displaying the message in a non-confidential messaging view of the software application such that messaging participant identity information is viewable; and responsive to a determination, by the computing device, that the message is a confidential message, displaying the message in a confidential messaging view of the software application such that messaging participant identity information is obfuscated.

Example 24 includes the subject matter of Example 23, wherein determination that the message is a non-confidential message or a confidential message is based on a mode property included with the message.

Example 25 includes the subject matter of any of Examples 23 and 24, wherein determination that the message is a non-confidential message or a confidential message is based on a type of view of the software application used to send the message.

Example 26 includes the subject matter of any of Examples 23 through 25, wherein the software application is a conferencing application.

Example 27 includes the subject matter of any of Examples 23 through 25, wherein the software application is a messaging application.

Example 28 includes the subject matter of any of Examples 23 through 27, wherein the messaging participant identity information is partially hidden in the display of the message in the confidential messaging view.

Example 29 includes the subject matter of any of Examples 23 through 28, wherein an avatar representing the sender of the message is replaced with a random bitmap in the display of the message in the confidential messaging view.

Example 30 includes the subject matter of any of Examples 23 through 29, further including, responsive to receiving, by the computing device, a request to move a target message being displayed in the non-confidential messaging view to the confidential messaging view: changing a message type of the target message to indicate a confidential message; displaying the target message in the confidential messaging view; and removing the display of the target message from the non-confidential messaging view.

Example 31 includes the subject matter of Example 30, wherein changing the message type of the target message includes changing a mode property of the target message.

Example 32 includes the subject matter of any of Examples 30 and 31, wherein the target message is a part of a message thread, the method further including, responsive to receiving, by the computing device, a request to move the target message being displayed in the non-confidential messaging view to the confidential messaging view: changing a message type of messages in the message thread subsequent to the target message to indicate a confidential message; displaying the messages in the message thread subsequent to the target message in the confidential messaging view; and removing the display of the messages in the message thread subsequent to the target message from the non-confidential messaging view.

Example 33 includes the subject matter of any of Examples 30 through 32, further including, responsive to a determination, by the computing device, that the request to move the target message is by a sender of the target message, sending a notification of the request to move the target message to one or more recipients of the target message.

Example 34 includes a system including a memory and one or more processors in communication with the memory and configured to: receive a message via a software application running on the computing device; responsive to a determination that the message is a non-confidential message, display the message in a non-confidential messaging view of the software application such that messaging participant identity information is viewable; and responsive to a determination that the message is a confidential message, display the message in a confidential messaging view of the software application such that messaging participant identity information is obfuscated.

Example 35 includes the subject matter of Example 34, wherein determination that the message is a non-confidential message or a confidential message is based on a mode property included with the message.

Example 36 includes the subject matter of any of Examples 34 and 35, wherein determination that the message is a non-confidential message or a confidential message is based on a type of view of the software application used to send the message.

Example 37 includes the subject matter of any of Examples 34 through 36, wherein the software application is a conferencing application.

Example 38 includes the subject matter of any of Examples 34 through 36, wherein the software application is a messaging application.

Example 39 includes the subject matter of any of Examples 34 through 38, wherein the messaging participant identity information is partially hidden in the display of the message in the confidential messaging view.

Example 40 includes the subject matter of any of Examples 34 through 39, wherein an avatar representing the sender of the message is replaced with a random bitmap in the display of the message in the confidential messaging view.

Example 41 includes the subject matter of any of Examples 34 through 40, wherein the one or more processors are further configured to, responsive to receipt of a request to move a target message being displayed in the non-confidential messaging view to the confidential messaging view: change a message type of the target message to indicate a confidential message; display the target message in the confidential messaging view; and remove the display of the target message from the non-confidential messaging view.

Example 42 includes the subject matter of Example 41, wherein to change the message type of the target message includes to change a mode property of the target message.

Example 43 includes the subject matter of any of Examples 41 and 42, wherein the target message is a part of a message thread, the one or more processors are further configured to, responsive to receipt of a request to move the target message being displayed in the non-confidential messaging view to the confidential messaging view: change a message type of messages in the message thread subsequent to the target message to indicate a confidential message; display the messages in the message thread subsequent to the target message in the confidential messaging view; and remove the display of the messages in the message thread subsequent to the target message from the non-confidential messaging view.

Example 44 includes the subject matter of any of Examples 41 through 43, wherein the one or more processors are further configured to, responsive to a determination that the request to move the target message is by a sender of the target message, send a notification of the request to move the target message to one or more recipients of the target message.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect, connecting, and coupling.

All examples and conditional language recited in the present disclosure are intended for pedagogical examples to aid the reader in understanding the present disclosure, and are to be construed as being without limitation to such specifically recited examples and conditions. Although example embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A method comprising:
   receiving, by a computing device, a message from a sender to a recipient via a software application running on the computing device, the software application having a non-confidential messaging view and a confidential messaging view;
   determining, by the computing device, a message type of the message, the message type is one of a non-confidential message or a confidential message, the message type is included with the message; and
   displaying, by the computing device, the message in the confidential messaging view of the software application in response to a determination that the message type indicates a confidential message, the confidential messaging view being distinct from the non-confidential messaging view, wherein messaging participant identity information is obfuscated in the display of the message in the confidential messaging view, the obfuscation causing the messaging participant identity information to be partially hidden in the display of the message in the confidential messaging view.

2. The method of claim 1, wherein determining the message type is based on a mode property included with the message.

3. The method of claim 1, wherein the message type is based on a type of view of the software application used by the sender to send the message to the recipient.

4. The method of claim 1, wherein the software application is a conferencing application.

5. The method of claim 1, wherein the software application is a messaging application.

6. The method of claim 1, wherein an avatar representing the sender of the message is replaced with a random bitmap in the display of the message in the confidential messaging view.

7. The method of claim 1, further comprising, responsive to receiving, by the computing device, a request to move a target message being displayed in the non-confidential messaging view to the confidential messaging view:
   changing the message type of the target message to indicate a confidential message;
   displaying the target message in the confidential messaging view; and
   removing the display of the target message from the non-confidential messaging view.

8. The method of claim 7, wherein changing the message type of the target message includes changing a mode property of the target message.

9. The method of claim 7, wherein the target message is a part of a message thread, the method further comprising:
   responsive to receiving, by the computing device, a request to move the target message being displayed in the non-confidential messaging view to the confidential messaging view,
      changing the message type of messages in the message thread subsequent to the target message to indicate a confidential message;
      displaying the messages in the message thread subsequent to the target message in the confidential messaging view; and
      removing the display of the messages in the message thread subsequent to the target message from the non-confidential messaging view.

10. The method of claim 7, further comprising, responsive to a determination, by the computing device, that the request to move the target message is by the sender of the target message, sending a notification of the request to move the target message to one or more recipients of the target message.

11. A computing device comprising:
   a memory; and
   one or more processors in communication with the memory and configured to,
      receive a message from a sender to a recipient via a software application running on the computing device, the software application having a non-confidential messaging view and a confidential messaging view;
      determine a message type of the message, the message type is one of a non-confidential message or a confidential message, the message type is included with the message; and
      display the message in the confidential messaging view of the software application in response to a determination that the message type indicates a confidential message such that messaging participant identity information is obfuscated in the display of the message in the confidential messaging view, the obfuscation causes the messaging participant identity information to be partially hidden in the display of the message in the confidential messaging view, wherein the confidential messaging view is distinct from the non-confidential messaging view.

12. The computing device of claim 11, wherein the message type determination is based on a mode property included with the message.

13. The computing device of claim 11, wherein the software application is one of a conferencing application or a messaging application.

14. The computing device of claim 11, wherein obfuscation of messaging participant identity information includes replacement of an avatar representing the sender of the message with a random bitmap.

15. The computing device of claim 11, wherein the one or more processors are further configured to, responsive to a request to move a target message being displayed in the non-confidential messaging view to the confidential messaging view:
   change the message type of the target message to indicate a confidential message;
   display the target message in the confidential messaging view; and
   remove the display of the target message from the non-confidential messaging view.

16. The computing device of claim 15, wherein the target message is a part of a message thread, and the one or more processors are further configured to:
   responsive to a request to move the target message being displayed in the non-confidential messaging view to the confidential messaging view,
      change the message type of messages in the message thread subsequent to the target message to indicate a confidential message;
      display the messages in the message thread subsequent to the target message in the confidential messaging view; and
      remove the display of the messages in the message thread subsequent to the target message from the non-confidential messaging view.

17. The computing device of claim 15, wherein the one or more processors are further configured to, responsive to a determination that the request to move the target message is by the sender of the target message, send a notification of the request to move the target message to one or more recipients of the target message.

18. A method comprising:
   receiving, by a computing device, a message via a software application running on the computing device, the message including an indication of a message type, the message type is one of a non-confidential message or a confidential message;
   responsive to a determination, by the computing device, that the message is a non-confidential message, displaying the message in a non-confidential messaging view of the software application such that messaging participant identity information is viewable; and
   responsive to a determination, by the computing device, that the message is a confidential message, displaying the message in a confidential messaging view of the software application such that messaging participant identity information is obfuscated, the obfuscation causing the messaging participant identity information to be partially hidden in the display of the message in the confidential messaging view.

* * * * *